(12) United States Patent
Chi et al.

(10) Patent No.: US 8,947,322 B1
(45) Date of Patent: Feb. 3, 2015

(54) CONTEXT DETECTION AND CONTEXT-BASED USER-INTERFACE POPULATION

(75) Inventors: Liang-Yu (Tom) Chi, San Francisco, CA (US); Robert Allen Ryskamp, Zurich (CH); Aaron Joseph Wheeler, San Francisco, CA (US); Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 13/423,392

(22) Filed: Mar. 19, 2012

(51) Int. Cl.
*G09G 5/00* (2006.01)

(52) U.S. Cl.
USPC .............................. 345/8; 345/629; 345/156

(58) Field of Classification Search
CPC ...................................................... G09G 5/00
USPC .............. 345/1.1, 7–9, 629; 348/46; 715/744, 715/747, 850
See application file for complete search history.

(56) References Cited

U.S. PATENT DOCUMENTS

| | | | |
|---|---|---|---|
| 5,880,733 A | 3/1999 | Horvitz et al. | |
| 5,900,849 A | 5/1999 | Gallery et al. | |
| 5,977,935 A | 11/1999 | Yasukawa et al. | |
| 6,184,847 B1 | 2/2001 | Fateh et al. | |
| 6,292,158 B1 | 9/2001 | Amafuji et al. | |
| 6,327,522 B1 | 12/2001 | Kojima et al. | |
| 6,353,436 B1 | 3/2002 | Reichlen | |
| 6,951,515 B2 | 10/2005 | Ohshima et al. | |
| 7,395,507 B2 * | 7/2008 | Robarts et al. | 715/744 |
| 7,487,462 B2 | 2/2009 | Good et al. | |
| 7,724,278 B2 | 5/2010 | Maguire, Jr. | |
| 7,825,996 B2 | 11/2010 | Yamada et al. | |
| 7,928,926 B2 | 4/2011 | Yamamoto et al. | |
| 2001/0006376 A1 | 7/2001 | Numa | |
| 2002/0044152 A1* | 4/2002 | Abbott et al. | 345/629 |
| 2002/0105482 A1 | 8/2002 | Lemelson et al. | |
| 2002/0126066 A1 | 9/2002 | Yasukawa et al. | |
| 2003/0210228 A1 | 11/2003 | Ebersole et al. | |
| 2004/0093141 A1 | 5/2004 | Rao et al. | |
| 2005/0154505 A1 | 7/2005 | Nakamura et al. | |
| 2006/0080604 A1 | 4/2006 | Anderson | |
| 2007/0241936 A1 | 10/2007 | Arthur et al. | |
| 2008/0005702 A1 | 1/2008 | Skourup et al. | |
| 2008/0055194 A1 | 3/2008 | Baudino et al. | |
| 2009/0005961 A1 | 1/2009 | Grabowski et al. | |
| 2009/0140845 A1 | 6/2009 | Hioki | |
| 2009/0208052 A1 | 8/2009 | Kaplan | |
| 2010/0013739 A1 | 1/2010 | Sako et al. | |

(Continued)

OTHER PUBLICATIONS

Kooper & MacIntyre "Browsing the Real-World Wide Web: Maintaining Awareness of Virtual Information in an AR Information Space," 16(3) International Journal of Human-Computer Interaction 425-446 2003.

*Primary Examiner* — Andrew Sasinowski
(74) *Attorney, Agent, or Firm* — McDonnell Boehnen Hulbert & Berghoff LLP

(57) ABSTRACT

Exemplary methods and systems relate to a wearable computing device determining a user-context and dynamically changing the content of a user-interface based on the determined user-context. The device may determine a user-context based on digital context; such as a text document a user is reading or a current website the device is accessing. User-context may also be based on physical context; such as the device's location or the air temperature around a user. Once a user-context is determined, a device may identify content that is related to the user-context and add objects representing this related content to a user-interface.

19 Claims, 14 Drawing Sheets

(56) References Cited

U.S. PATENT DOCUMENTS

| | | | |
|---|---|---|---|
| 2010/0208033 A1* | 8/2010 | Edge et al. | 348/46 |
| 2010/0292886 A1 | 11/2010 | Szczerba et al. | |
| 2011/0072492 A1 | 3/2011 | Mohler et al. | |
| 2011/0115703 A1 | 5/2011 | Iba et al. | |
| 2011/0161875 A1 | 6/2011 | Kankainen | |
| 2011/0214082 A1 | 9/2011 | Osterhout et al. | |
| 2012/0224060 A1 | 9/2012 | Gurevich et al. | |
| 2013/0044128 A1 | 2/2013 | Liu et al. | |

* cited by examiner

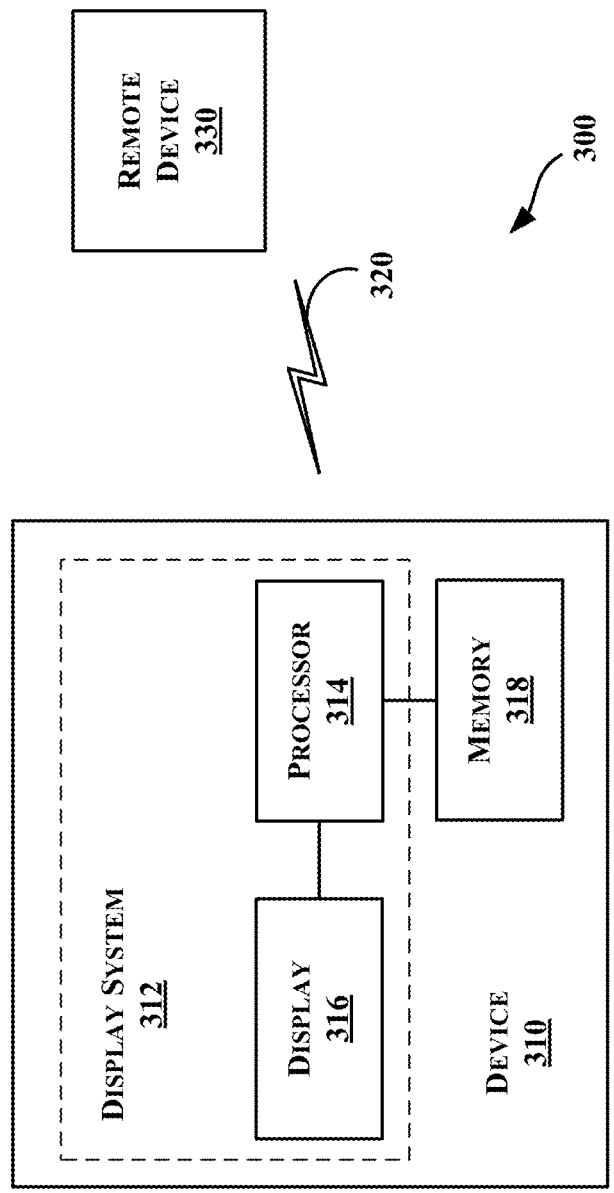

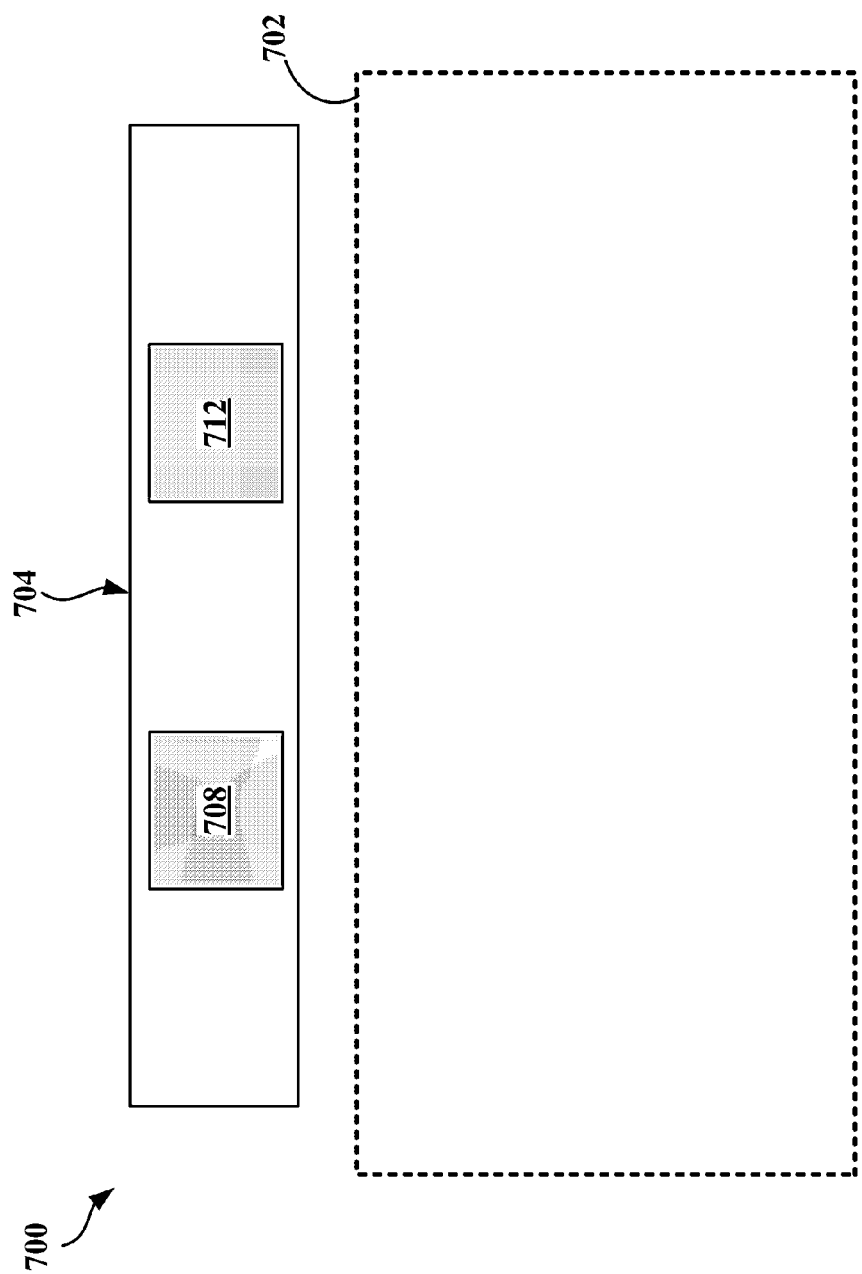

CONTEXT DETECTION AND CONTEXT-BASED USER-INTERFACE POPULATION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware and peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the user's field of vision, and appears as a normal sized image, such as might be displayed on a traditional image display device. Such technology may be referred to as "near-eye displays."

Near-eye displays, also sometimes called "head-mounted displays" (HMDs), are fundamental components of wearable display-devices. A head-mounted display-device places one or more graphic displays close to a wearer's eye or eyes. A wearable computer processing system may generate the images on a display. Further, head-mounted displays may be as small as a pair of glasses or as large as a helmet.

Emerging and anticipated uses of wearable display-devices include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary method involves a wearable computing device causing a portion of a user-interface to be displayed, in which the user-interface includes a view region and a content region, with the content region containing a set of selectable content objects and the content region not being fully displayed in the first portion of the user-interface. The method further involves determining a user-context associated with the wearable computing device and dynamically changing the set of selectable content objects contained in the content region based on the determined user-context. Also, in the exemplary method, movement data corresponding to a given movement of the wearable computing device is received and, in response to receiving the movement data, the content region is displayed more fully.

In another aspect, an exemplary wearable computing device includes at least one processor and data storage containing logic that is executable by the at least one processor. The logic is executable to cause a portion of a user-interface to be displayed, with the user-interface including a view region and a content region, and with the content region containing a set of selectable content objects and the content region not being fully displayed in the portion of the user-interface. The logic is also executable to determine a user-context associated with the wearable computing device and to dynamically change the set of selectable content objects contained in the content region based on the determined user-context. In response to at least receiving movement data corresponding to a given movement of the wearable computing device, the logic is further executable to more fully display the content region. Displaying the content region more fully may be accomplished by moving more of the content region into the displayed portion of the user-interface and/or by moving the displayed portion of the user-interface to encompass more of the content region.

In another aspect, an exemplary non-transitory computer-readable medium has instructions stored thereon, with the instructions being executable by a wearable computing device to cause the wearable computing device to perform functions. The functions include causing a portion of a user-interface to be displayed, with the user-interface comprising a view region and a content region, with the content region containing a set of selectable content objects, and with the displayed portion of the user-interface not fully containing the content region. The functions also include determining a user-context associated with the wearable computing device and dynamically changing the set of selectable content objects contained in the content region based on the determined user-context. Further, the functions include receiving movement data corresponding to a given movement of the wearable computing device, and in response to at least receiving the movement data, causing the content region to be more fully displayed. As with the exemplary wearable computing device, the content region and/or the displayed portion of the user-interface may be moved to more fully display the content region.

BRIEF DESCRIPTION OF THE DRAWINGS

FIG. 3 is a simplified block diagram of an example computer network infrastructure.

FIG. 7B shows aspects of an example user-interface after removing content objects.

DETAILED DESCRIPTION

Figure 1A:
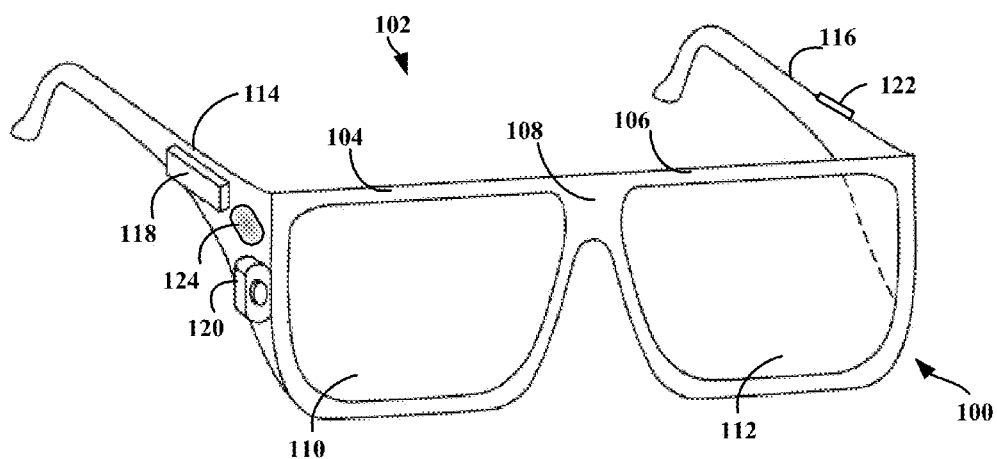
FIG. 1A illustrates an example head-mounted display system.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Some of the following exemplary embodiments describe a wearable device performing processing, detection, and displaying method steps. However, all or some processing and detection steps may be performed by external processing and detection means in communication with the wearable device. For example, a remotely connected server system may receive user-context signals from the wearable device, determine a user-context based on context signals, identify content that is related to the determined user-context, and transmit the identified related content to the wearable device. As another example, may be tracked by remotely-connected detection means (for example, a camera observing the display-device). Then the display-device may receive indications of its physical orientation from the remotely-connected detection means.

1. Overview

The presently disclosed method and corresponding apparatus provides for dynamic, context-based establishment of content regions by a wearable device. The method may begin with the wearable device displaying a user-interface and not, or not fully, displaying one or more content regions. The method may then involve the wearable device determining a user-context and responsively adjusting the content of one or more of the content regions to correspond with the determined user-context. Further, the method may involve detecting physical movement of the wearable device and responsively moving the one or more adjusted content regions into view, or more fully into view.

Advantageously, populating a content region with context-specific choices may help in limiting intensive file browsing and unnecessary displayed content. For example, if the wearable device determines that a user is in a meeting with a person from whom the user recently received an email, the device may provide a link to the email. The user could then look over the email without leaving the meeting or wasting time searching for the file.

In practice, a wearable computing device may determine a user-context by gathering a variety of user-context signals from sensors, processes, data storage, and connected devices and associating and comparing these user-context signals. Two exemplary types of user-context signals will be specifically explored: digital-context signals and physical-context signals.

Digital-context signals are data representing digital media that a user is accessing, for example, the documents a user is reading, the emails a user receives, the music to which a user is listening, etc. A wearable device may determine a digital user-context based on multiple context signals. This digital user-context may represent either content accessed directly on the wearable device or content that a user accesses on other devices connected to the wearable device. For example, the wearable device may be in communication with an associated desktop computer. Then, the files accessed on the desktop computer may become part of the digital user-context.

Physical-context signals, on the other hand, may be data representing aspects of the physical environment and situation in which a wearable device is used. Physical-context signals may include, for example, the device's geographic location, the people around a user, the time of day, the air temperature, the type of physical activity in which the user is engaged, etc. The wearable device may gather physical-context signals from sensors either connected externally or integral to the wearable device and use these physical-context signals to determine a physical user-context.

Once a user-context has been determined, the wearable device may adjust one or more of the content regions to correspond with the determined user-context by finding related content and adding to the one or more content regions, content objects representing this content. A wearable device may find related content by searching the device's own memory and/or by connecting to an external system (e.g., the Internet, a connected device, and/or a remote database).

In some cases, the device may store and annotate digital and physical-context signals, allowing the wearable device to associate stored digital content with current user-context data more easily. For example, the device may have detected that the user was reading a particular document (digital context) in a particular place (physical context). The device may annotate the particular document with an indication of the particular place and/or may annotate the particular place with an indication of the particular document. When the user returns to the particular place, the device may then populate a content region in the user-interface with the particular document.

In other cases, the wearable device may determine the relationship between the user-context and content automatically. For example, a wearable device may refer to an online music catalog to find content related to a user's current musical selection (e.g., cover art, song history, similar groups, etc.) without needing to annotate or refer to any saved context data.

Additionally, in adjusting a content region to correspond with the determined user-context, a wearable device may remove content objects from the content region. For example, a wearable device may remove some content objects because they relate to a previously determined user-context and are less related, or unrelated, to the current user-context. As another example, the wearable device may remove content objects to make room for new context-related content objects.

2. Example System and Device Architecture

FIG. 1A illustrates an example system 100 for receiving, transmitting, and displaying data. The system 100 is shown in the form of a wearable computing device. While FIG. 1A illustrates a head-mounted device 102 as an example of a wearable computing device, other types of wearable computing devices could additionally or alternatively be used. As illustrated in FIG. 1A, the head-mounted device 102 has frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected by wires or wirelessly connected to the head-mounted device 102). The on-board computing system 118 may include a processor and memory, for example. The on-board computing system 118 may be configured to receive and analyze data from the video camera 120, the sensor 122, and the finger-operable touch pad 124 (and possibly from other sensory devices, user-interfaces, or both) and generate images for output by the lens elements 110 and 112. The on-board computing system 118 may additionally include a speaker or a microphone for user input (not shown). An example computing system is further described below in connection with FIG. 4.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present each finger-operable touch pad may be operated independently, and may provide a different function.

Figure 1B:
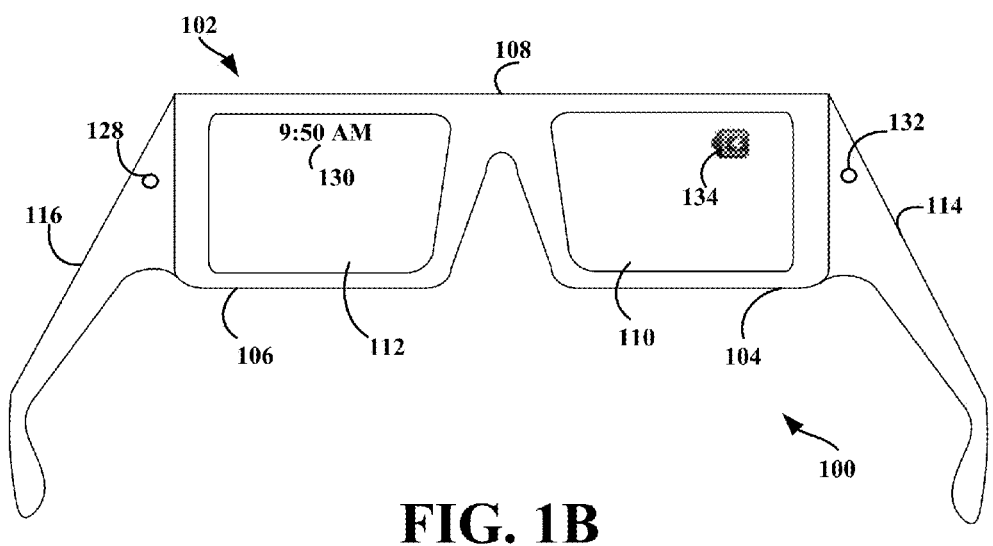
FIG. 1B illustrates an alternate view of the system illustrated in FIG. 1A.

FIG. 1B illustrates an alternate view of the system 100 illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

Figure 2A:
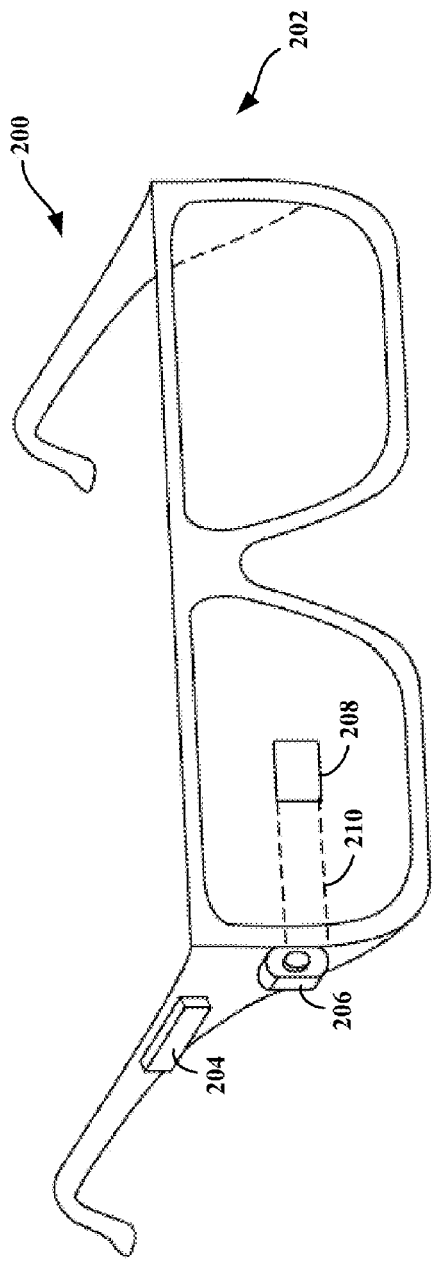
FIG. 2A illustrates an example system for receiving, transmitting, and displaying data.

FIG. 2A illustrates an example system 200 for receiving, transmitting, and displaying data. The system 200 is shown in the form of a wearable computing device 202. The wearable computing device 202 may include frame elements and side-arms such as those described with respect to FIGS. 1A and 1B. The wearable computing device 202 may additionally include an on-board computing system 204 and a video camera 206, such as those described with respect to FIGS. 1A and 1B. The video camera 206 is shown mounted on a frame of the wearable computing device 202; however, the video camera 206 may be mounted at other positions as well.

As shown in FIG. 2A, the wearable computing device 202 may include a single display 208 which may be coupled to the device. The display 208 may be formed on one of the lens elements of the wearable computing device 202, such as a lens element described with respect to FIGS. 1A and 1B, and may be configured to overlay computer-generated graphics in the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

Figure 2B:
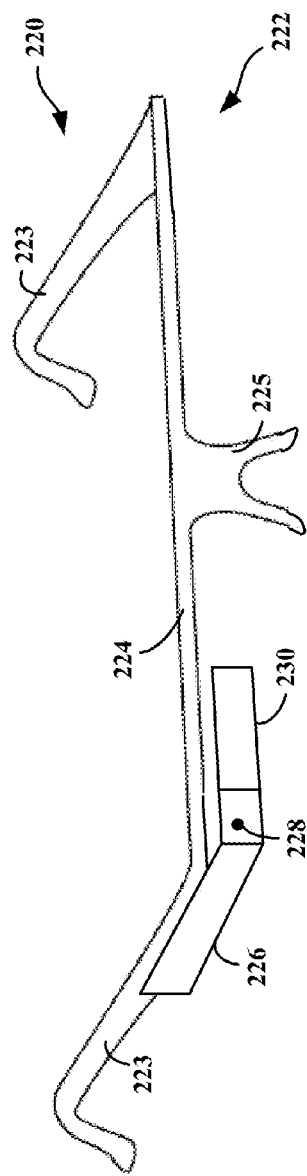
FIG. 2B illustrates an example system for receiving, transmitting, and displaying data.

FIG. 2B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 2B, the center frame support 224 connects the side-arms 223. The wearable computing device 222 does not include lens-frames containing lens elements. The wearable computing device 222 may additionally include an on-board computing system 226 and a video camera 228, such as those described with respect to FIGS. 1A and 1B.

The wearable computing device 222 may include a single lens element 230 that may be coupled to one of the side-arms 223 or the center frame support 224. The lens element 230 may include a display such as the display described with reference to FIGS. 1A and 1B, and may be configured to overlay computer-generated graphics upon the user's view of the physical world. In one example, the single lens element 230 may be coupled to a side of the extending side-arm 223. The single lens element 230 may be positioned in front of or proximate to a user's eye when the wearable computing device 222 is worn by a user. For example, the single lens element 230 may be positioned below the center frame support 224, as shown in FIG. 2B.

FIG. 3 shows a simplified block diagram of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, the device 310 may be a heads-up display system, such as the head-mounted device 102, 200, or 220 described with reference to FIGS. 1A-2B.

Thus, the device 310 may include a display system 312 comprising a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 3, the communication link 320 is illustrated as a wireless connection; however, wired connections may also be used. For example, the communication link 320 may be a wired serial bus such as a universal serial bus or a parallel bus, among other connections. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 330 may be accessible via the Internet and may include a computing cluster associated with a particular web service (e.g., social-networking, photo sharing, address book, etc.).

Figure 4:
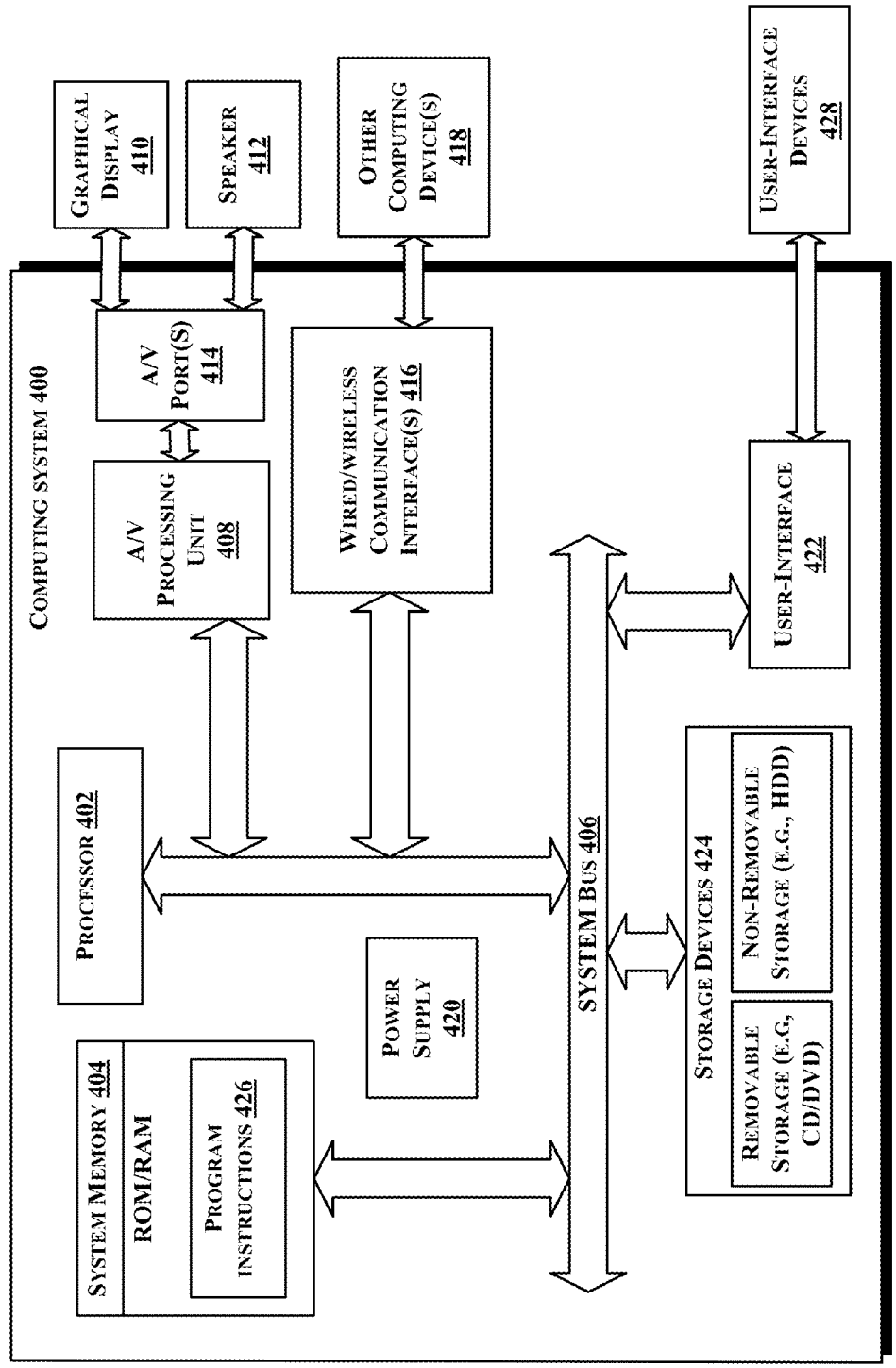
FIG. 4 is a simplified block diagram depicting example components of an example computing system.

As described above in connection with FIGS. 1A-2B, an example wearable computing device may include, or may otherwise be communicatively coupled to, a computing system, such as computing system 118 or computing system 204. FIG. 4 shows a simplified block diagram depicting example components of an example computing system 400. One or both of the device 310 and the remote device 330 may take the form of computing system 400.

Computing system 400 may include at least one processor 402 and system memory 404. In an example embodiment, computing system 400 may include a system bus 406 that communicatively connects processor 402 and system memory 404, as well as other components of computing system 400. Depending on the desired configuration, processor 402 can be any type of processor including, but not limited to, a microprocessor (μP), a microcontroller (μC), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof.

An example computing system 400 may include various other components as well. For example, computing system 400 includes an A/V processing unit 408 for controlling graphical display 410 and speaker 412 (via A/V port 414), one or more communication interfaces 416 for connecting to other computing devices 418, and a power supply 420. Graphical display 410 may be arranged to provide a visual depiction of various input regions provided by user-interface module 422. For example, user-interface module 422 may be configured to provide a user-interface, such as the example user-interface described below in connection with FIG. 6, and graphical display 410 may be configured to provide a visual depiction of the user-interface. User-interface module 422 may be further configured to receive data from and transmit data to (or be otherwise compatible with) one or more user-interface devices 428.

Furthermore, computing system 400 may also include one or more data storage devices 424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 400.

According to an example embodiment, computing system 400 may include program instructions 426 that are stored in system memory 404 (and/or possibly in another data-storage medium) and executable by processor 402 to facilitate the various functions described herein. Although various components of computing system 400 are shown as distributed components, it should be understood that any of such components may be physically integrated and/or distributed according to the desired configuration of the computing system.

3. Example System Operation

Figure 5:
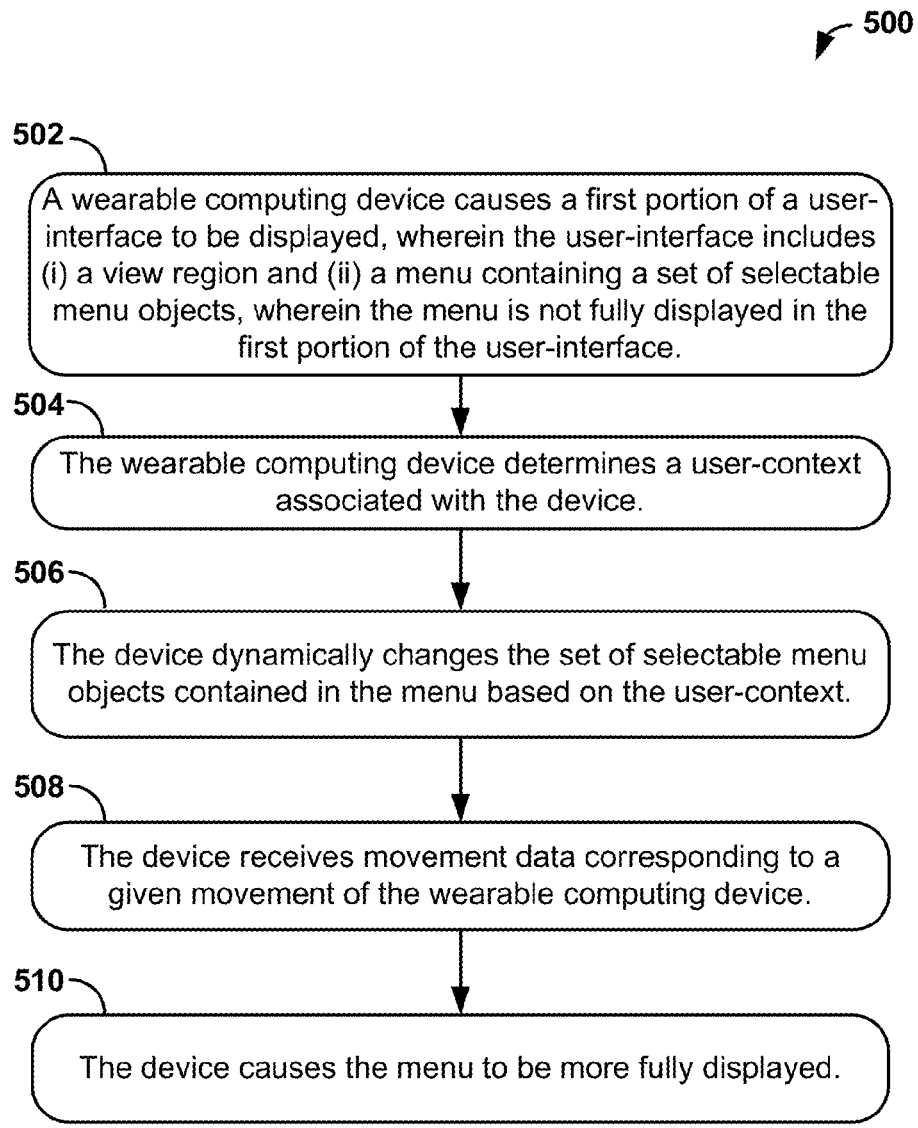
FIG. 5 is a simplified flow chart illustrating a method according to an exemplary embodiment.

FIG. 5 is a flow-chart illustrating an exemplary method 500 for carrying out this process. As shown in block 502, method 500 starts with a wearable computing device displaying a first portion of a user-interface, with the user-interface including (i) a view region and (ii) a content region, containing a set of selectable content objects, and with the content region not being fully displayed in the first portion of the user-interface.

Then, at block 504, the wearable computing device determines a user-context associated with the device. This process may be carried out in several steps including, for instance, gathering user-context signals, associating user-context signals, and determining a user-context based on the user-context signals. An exemplary system may gather various types of user-context signals (for example, physical-context signals and/or digital-context signals) and an exemplary user-context may encompass any or all types of user-context.

Next, based on the determined user-context, the wearable device dynamically changes the set of selectable content objects contained in the content region, as illustrated by block 506. For instance, a wearable device may identify content that corresponds with the determined user-context from the process step of block 504. Then, the wearable device may add content objects representing the identified content to a content region and/or remove current content objects from a content region to better fit the determined user-context.

At block 508, the device receives movement data corresponding to a given movement of the wearable computing device. This movement data may be received from integral sensors in the wearable device or from external sensors connected to the device. And at block 510, the device causes the content region to be more fully displayed. These steps may occur before, concurrently with, or after the process steps illustrated by blocks 504 and 506.

a. Example User-Interface

Figure 6:
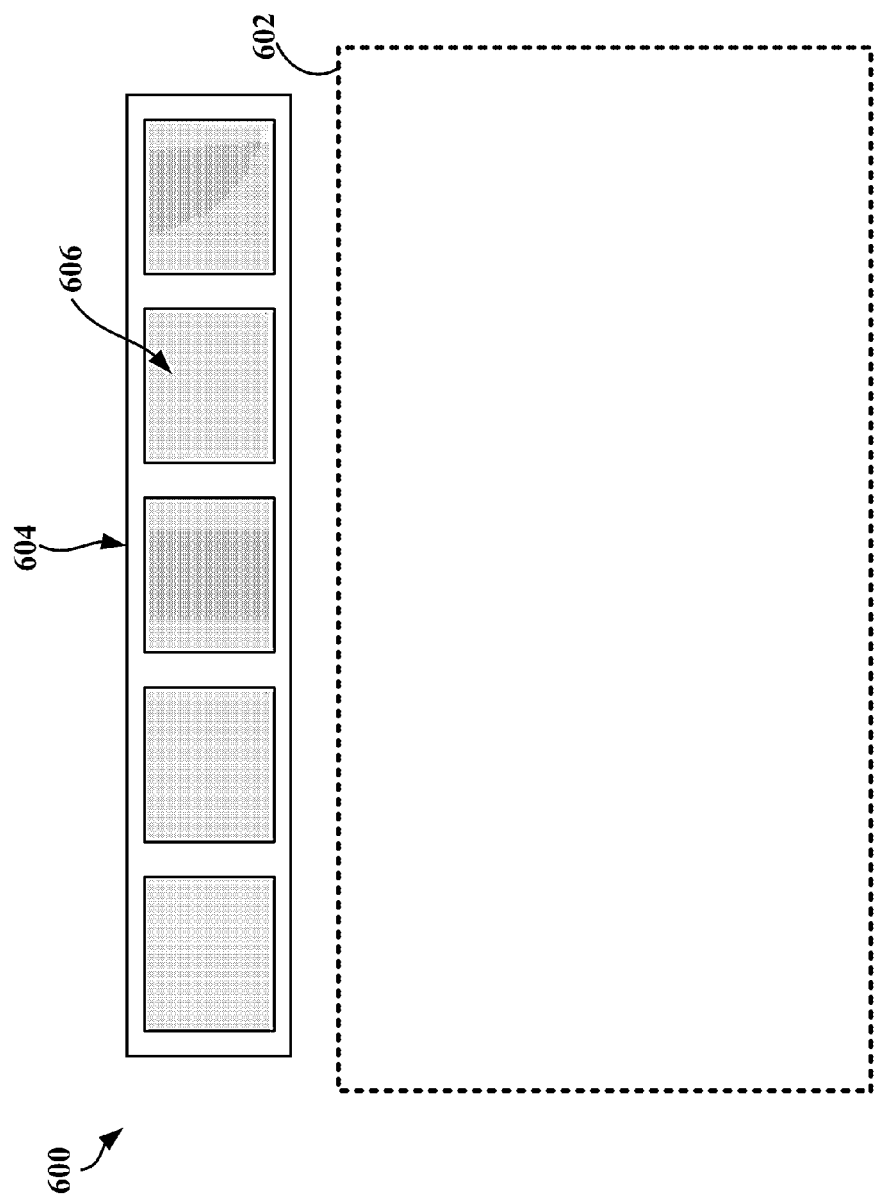
FIG. 6 shows aspects of an example user-interface.

FIG. 6 shows aspects of an example user-interface 600. The user-interface 600 may be displayed by a display-device as described above with respect to FIGS. 1A-2B, for example.

An example state of the user-interface 600 is shown in FIG. 6. The example state shown in FIG. 6 may correspond to a first position of the wearable computing device. That is, the user-interface 600 may be displayed as shown in FIG. 6 when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 600 includes a view region 602. An example boundary of the view region 602 is shown by a dotted frame. While the view region 602 is shown having a landscape shape (in which the view region 602 is wider than it is tall), in other embodiments the view region 602 may have a portrait or square shape, or may have a non-rectangular shape, such as a circular or elliptical shape. The view region 602 may have other shapes as well.

The view region 602 may be, for example, the viewable area between (or encompassing) the upper, lower, left, and right boundaries of a display on the wearable computing device, or in other words, may substantially fill the display in an HMD. As shown, when the wearable computing device is in the first position, the view region 602 is substantially empty (e.g., completely empty) of user-interface elements, such that the user's view of their real-world environment is generally uncluttered, and objects in the user's environment are not obscured.

In some embodiments, the view region 602 may correspond to a field of view of a wearer of the wearable computing device, and an area outside the view region 602 may correspond to an area outside the field of view of the wearer. In other embodiments, the view region 602 may correspond to a non-peripheral portion of a field of view of a wearer of the wearable computing device, and an area outside the view region 602 may correspond to a peripheral portion of the field of view of the wearer. In still other embodiments, the user-interface 600 may be larger than or substantially the same as a field of view of a wearer of the wearable computing device, and the field of view of the wearer may be larger than or substantially the same size as the view region 602. The view region 602 may take other forms as well.

Accordingly, the portions of the user-interface 600 outside of the view region 602 may be outside of or in a peripheral portion of a field of view of a wearer of the wearable computing device. For example, as shown, a content region 604 may be outside of or in a peripheral portion of the field of view of the user in the user-interface 600. While the content region 604 is shown to be not visible in the view region 602, in some embodiments the content region 604 may be partially visible in the view region 602.

As shown, the content region 604 includes a number of selectable content objects 606. The content region 604 may take several forms. For example, the content region 604 may be displayed as an ordered or unordered list of content objects 606, either horizontally or vertically. The content region 604 may also display content objects individually or in groups. Further, these content objects may be positioned in an ordered and logical way, in a user-specified way, or in a randomized way.

In some embodiments, the content objects 606 may be arranged in a ring (or partial ring) around and above the head of a wearer of the wearable computing device. A ring or partial ring in this sense should not be considered necessarily circular, but rather may be represented by any type of arc, ellipse, or combination of arcs. In other embodiments, the content objects 606 may be arranged in a dome-shape above the wearer's head. The ring or dome may be centered above the wearable computing device and/or the wearer's head. In other embodiments, the content objects 606 may be arranged in other ways as well.

The number of selectable content objects 606 in the content region 604 may be fixed or may be variable. In embodiments where the number is variable, the content objects 606 may vary in size according to the number of content objects 606 in the content region 604. In embodiments where the content objects 606 extend circularly around a wearer's head, like a ring (or partial ring), only some of the content objects 606 may be visible at a particular moment. In order to view other content objects 604, a wearer of the wearable computing device may interact with the wearable computing device to, for example, rotate the content objects 606 along a path (e.g., clockwise or counterclockwise) around the wearer's head. To this end, the wearable computing device may be configured to receive data indicating such an interaction through, for example, a touch pad, such as finger-operable touch pad 124. Alternatively or additionally, the wearable computing device may be configured to receive such data through other input devices as well.

Depending on the application of the wearable computing device, the selectable content objects 606 may take several forms. For example, the content objects 606 may represent one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 606 may take other forms as well.

In embodiments where the content objects 606 include tools, the tools may be located in a particular section of the content region 604, such as the center. In some embodiments, the tools may remain in the center of the content region 604, even if the other content objects 606 rotate, as described above. Tool content objects may be located in other regions of the content region 604 as well.

An order or configuration in which the selectable content objects 606 are displayed may be fixed or variable. In one embodiment, the content objects 606 may be pre-ordered by a wearer of the wearable computing device. In another embodiment, the content objects 606 may be automatically ordered based on, for example, how often each content object 606 is used how recently each content object 606 was used, an explicit or implicit importance or priority ranking of the content objects 606, and/or other criteria.

A wearable device may adjust any of the above-described characteristics of content objects 606 (i.e., arrangement, number, form, size, and configuration) based on user-context, as will be described in following sections.

b. Example User-Context Signals

Generally, a wearable device may determine a user-context based on one or more "user-context signals." User-context signals are computer-readable data representing aspects of the context in which a wearable device is used. The wearable device may internally determine various user-context signals and/or acquire user-context signals from other sources.

A user-context signal may be any computer-readable signal that provides information pertaining to the state or the environment associated with a certain subject (e.g., with a certain user, device, event, etc.) A wearable device may receive user-context signals as various forms of data, and the wearable device may receive this information from many sources.

User-context signals that represent similar or related user-context information may be grouped into categorical or other context signal groups. For example, physical and digital-context signals are discussed in the overview and other sections. As another example, "biological" user-context signals may be computer-readable signals that represent a user's physical health and wellness. Similarly, "social" user-context signals may be computer-readable data that portrays a user's interactions with other people. Countless other labels may be applied to user-context signals, so the categories discussed here should not be viewed as limiting.

As explained in the overview, certain user-context signals may be referred to as "physical-context signals" because they relate to aspects of the physical context in which a user uses a wearable device. For instance, physical-context signals may represent time-based information, such as: (1) a current time, (2) a current date, (3) the current day of the week, (4) the current month, (5) the current season, (6) a time of a future event or future context, (7) a date of a future event or future context, (8) a day of the week of a future event or future context, (9) a month of a future event or future context, (10) a season of a future event or future context, (11) a time of a past event or past context, (12) a date of a past event or past context, (13) a day of the week of a past event or past context, (14) a month of a past event or past context, and (15) a season of a past event or past context.

Some physical-context signals may represent sensor readings, such as: (1) an ambient temperature, (2) ambient noise level (3) any recognizable sounds detected around the wearable computing device, (4) items that are currently detected around the wearable computing device, (5) items that have been detected around the wearable computing device, (6) health statistics and characterizations of a user's current health, (7) a user's recent context as determined from sensors on or near the user and/or other sources of context information, (8) a current location, and (9) a past location.

Further, physical-context signals may represent data stored on remote servers, for example: (1) a current, future, or past weather forecast at a current location; (2) a current, future, or past weather forecast at a location of a planned event; (3) a current, future, or past weather forecast at or near a location of a previous event; (4) information on a calendar associated with a user-profile, such as information regarding events or statuses of a user or a user's friends; (5) information accessible via a user's social networking account, such as information relating to a user's status, statuses of a user's friends in a social network group, and/or communications between the user and the user's friends; and (6) information derived from cross-referencing two or more of: information on a user's calendar, information available via a user's social networking account, and other physical-context signals and sources of context information.

In addition to physical-context signals, a wearable device may also receive "digital-context signals", which represent the state of computing systems and a user's interaction with such systems. For example, a digital-context signal may be computer-readable data indicating the state of and a user's history with the wearable device, other digital devices, and computing servers or systems. Additionally, digital-context signals may represent the actions of other devices, servers, or systems that are indicative of a user-context, but relate indirectly to the user.

As used in this and other sections, digital-context signals are considered "digital" because they represent user-context arising from the use of digital devices, not because the signals themselves are necessarily digital data. For example, if a user plays a song on a digital music player, while the music player is not communicatively connected to a wearable device, the wearable device may detect this digital user-context as an analog acoustic signal from a microphone. Then, the wearable device may determine the song that was playing (for example, by searching an online song database or by searching the digital music player's memory) and reference the determined song with a digital-context signal.

Digital-context signals may represent: (1) items that are currently in communication with other devices associated with a user of the wearable computing device, (2) items that have previously been in communication with other devices associated with a user of the wearable computing device, (3) computer-readable media currently accessed on the wearable computing device, (4) computer-readable media previously accessed on the wearable computing device, (5) computer-readable media currently accessed on other devices associated with a user of the wearable computing device, and (6) computer-readable media previously accessed on other devices associated with a user of the wearable computing device.

In some instances, a digital-context signal for a given device may include the respective states of computer applications that are open or running on the device. For instance, a digital-context signal representing a certain computer application may: (a) identify a file or files that are open and/or being accessed by the application; (b) indicate whether the application is minimized, maximized, or displayed in an application window; (c) indicate the size and/or position of the application window; (d) indicate user-settings for this application, and/or (e) identify other state information relating to the application.

As a specific example, a digital-context signal for a web-browser application may include state information indicating: (a) a URL that is open in the browser, (b) whether or not multiple tabs are open in the browser (and if so, which URLs are open in which tabs), (c) a browsing history, (d) favorite sites, (e) temporary Internet files, (f) cookies, (g) form data, (h) passwords, (i) other settings of web browser, and/or (j) other state information relating to the web browser.

As another example, a digital-context signal for a word-processing application may include state information indicating: (a) files that are open and/or being edited in the application, (b) the size or position of an application window, (c) specific words being written or selected in a document, (d) page setup information, (e) current font and paragraph settings, (f) recently opened files, and/or (g) other user-configurable aspects corresponding to the word processing application.

In addition to user-interactions with a device, a digital-context signal may represent aspects of a device itself, such as device settings or properties. For instance, a digital-context signal may indicate a device's remaining battery life, a device's ability to send and/or receive data, and/or an operating mode of the device (e.g., whether the device is on, off, in standby mode, sleep mode, or a busy mode). Further, a digital-context signal may indicate a device's network-connectivity status, the bandwidth that is available to the device, the device's maximum available bandwidth, and/or other information related to the device's network connectivity and capabilities.

Some user-context signals may take the form of discrete measurements, while other user-context signals may be determined or measured over time. For example, a discrete user-context signal may represent the current amplitude (or volume) of an audio feed, while a time-evaluated user-context signal may represent the average amplitude of the last few minutes of the same audio feed. Likewise, data representing the current location of a wearable device may be a discrete user-context signal. The device may then determine, based on current and past location data, a time-evaluated context-signal representing the current velocity of the device. Further, another user-context signal may represent the current acceleration of the wearable device, as derived from current and past velocity data, for instance.

Further, in addition to or instead of evaluating a signal over time, a wearable device may process a raw context signal in numerous ways to produce additional user-context signals. For example, the wearable device may receive a video feed from an integral camera (e.g., video camera 206) and process the video feed using facial recognition software to recognize a particular person in the video feed. The user-context for this device may, therefore, include a processed user-context signal representing the presence of the particular person and a raw user-context signal representing the raw video feed itself. As another example, a raw user-context signal may represent the current date and time at the location of the wearable device. However, the wearable device may process this user-context signal by referencing solar and lunar charts for the device's geographic location to create a processed user-context signal representing the time until sunset and the phase of the moon at the location of the device.

The example digital and physical-context signals listed above are not intended to be limiting, and many other user-context signals and/or sources of context information will be clear to those of skill in the art.

c. Gathering User-Context Signals

A wearable device may receive user-context signals from integral detection and processing systems, external sensors and systems, or remote sources of context information. As an example, a wearable device may receive a video feed from an integral camera (e.g., camera 206) and represent this raw video feed with a user-context signal. Additionally, the same device may receive a user-context signal representing a video feed from a second camera externally connected to the device (e.g., a night-vision-enabled camera). Further, an application or automated process may receive user-context signals representing other video feeds from a remote server (e.g., an accessible website traffic camera streaming video from nearby traffic cameras).

A context source may send some user-context signals to a wearable device automatically (such as an active pressure gauge the continuously reports pressure). Additionally or alternatively, a context source may send some user-context signals only in response to the request from the wearable device (such as a passive pressure gauge that determines and sends pressure readings only when activated by an outside source). A wearable device may receive user-context signals repeatedly from some sources, so that these signals represent a continuously current user-context.

A remote server system may also gather user-context signals and determine aspects of a user-context. For example, a wearable device may transmit various user-context signals to a remote server and receive an indication of the current user-context from the server. Advantageously, the remote server may store received user-context signals, find and store related content, and gather user-context signals from other sources (for example, by searching the Internet). Thus, a remote server may help the wearable device to preserve storage and processing resources while determining a user-context.

A device may receive physical-context signals from various types of integral or externally connected sensors. For example, some sensors may measure characteristics of the device (e.g., battery level, geographical location, physical orientation, movement data, etc.). Other sensors may detect characteristics of a user (e.g., biometric data, whether the user is wearing or holding the device, physical characteristics of the user, physical actions of the user, data from inward-facing audio and visual sensors). Still other sensors may measure the environment around the device or user (e.g., data from outward facing acoustic or optical sensors, temperature, pressure, ambient light, RFID tag detection data). Any computer-readable signal from such sensors may be a physical-context signal or be referenced by a physical-context signal. A wearable device may receive some user-context signals as raw data signals and other user-context signals as processed signals.

Automated processes and/or applications on the device may also generate physical-context signals. For example, an internal clock and calendar may produce time-based and date-based context signals. The wearable device may also reference data stored in the device's memory to anticipate and originate context signals regarding events associated with a user (e.g., a party the user is attending, the user's age, or a holiday).

A wearable device may also gather physical context from remote devices, servers, and systems. For instance, a weather service may issue a severe weather alert for the area in which a device is operating. An automated process or application on the device may receive an indication of this alert over a wireless or wired Internet connection and send a context signal to the device indicating that severe weather is approaching. As another example, a web-based user-profile may contain status information about the user of a device and members of the user's social network. A wearable device may receive notifications from an application that accesses the user-profile and store these notifications as context signals associated with the status information. Many additional and alternative sources of physical user-context are contemplated in this design and other sources will be evident to those of skill in the art.

A wearable device may gather digital-context signals from digital processes performed on the wearable device itself, on other devices, and/or on remote systems and servers. When a wearable device gathers digital-context signals from other devices, it may be helpful to consider the device that collects and organizes this data as a "hub device". In some embodiments, the wearable device may function as the hub device, directly gathering digital context from other devices. In other embodiments, the wearable device may receive digital-context signals from a hub device. Devices from which the hub device gathers digital-context signals may form a device-group, and different device-groups may be associated with different physical contexts, user-contexts, and user-profiles. Further, the hub device may gather state information, representing the current state of a device in the device-group, and store data representing this state information as a digital-context signal.

A user and/or a hub device may select one or more devices from the device-group to include as sources of digital-context signals based on a number of factors. For example, user-input may indicate a tablet, a smartphone, a television receiver, and a laptop computer as potential sources of digital-context signals. Then, other factors may indicate to the hub device that digital-context signals should be gathered from a particular device in this device-group. For instance, if the hub device detects that the user is looking at the television receiver, the hub device may specifically connect with the television receiver to request state information. As another example, user-preferences may indicate that digital-context signals should be gathered from the tablet only after a user activates a particular application on the tablet. In addition to user-input and received user-context signals, a hub device may use numerous other factors and processes to select sources of digital-context signals.

To facilitate user selection of devices, a hub device may provide a graphical user-interface (GUI) that allows a user to specify devices that should be included as sources of digital context. For example, a hub device may search for available devices, and provide the user with a list of available devices in a source-selection GUI. Then, the user may interact with the GUI to select the devices from which the user would like digital-context signals gathered.

Once devices have been selected as sources of digital context, the hub device may determine the state of the selected devices and create digital-context signals related to the state of each device. Each digital-context signal may include (a) an identifier of the selected device and (b) the determined state of the selected device. A digital-context signal for a given device may include other data as well. The content of a digital-context signal may be specified by a wearable device, a hub device, or the device from which the signal is gathered. For example, a state-information request may indicate particular information that should be included in a digital-context signal. Additionally, a selected device may contain user-preferences indicating the particular state information that the selected device may then report in a digital-context signal.

As a specific example, a user of a wearable device may be working on a confidential document on their work computer. The wearable device may detect that the user is interacting with their work computer, and send a state-information request to the work computer. This request may specifically request application information from any open applications. The work computer may then send a response to the wearable device indicating that a word-processing application is open, and perhaps indicating some of the preferences of the application. However, because of the confidential nature of the document, the work computer may prevent any document information from being transmitted. The wearable device may then create a digital-context signal indicating the work computer and the state information that the work computer reported.

d. Storing and Associating User-Context Signals

In order to help determine user-contexts and identify related content, a wearable device may store gathered user-context signals. The wearable device may also annotate stored user-context signals to indicate associations between stored user-context signals and to create user-specific context connections. Further, a remote server may perform these storing and annotating processes. Automated processes, computer applications, or user-input may initiate storage and association of user-context signals.

A wearable device may store physical and digital-context signals for later access either on the device or on a remote system. If user-context signals are stored on the device itself, the device may help preserve processing and memory resources by determining which user-context signals to store and which user-context signals to delete. For example, user-context signals may be ranked by relative importance based on a number of factors, including: (a) recency, (b) user-input, (c) number of associations with other signals, (d) type of context signal, (e) context history, (f) stored user-preferences, and/or (g) resources used in storing the signal. If stored on a remote system, the remote system may also rank the signals, though the storage capacity of a remote system may be less restrictive.

If a particular context signal includes repeated measurements, several individual context signals may be stored as a single reference. For example, if a sensor takes a temperature measurement once a second, then a stable temperature may produce many repeated readings. In particular, if the temperature stays at 55° for two hours, all 7200 individual temperature measurements may be expressed cooperatively as a single context signal indicating the temperature and the amount of time that the temperature remained (e.g., 55° for two hours). As another example, only the context signals representing changes in user-context may be stored (e.g., 54° at 1:05:43, 55° at 1:50:00, 56° at 3:50:00 . . . ).

A wearable device may determine associations between context signals based on various factors. User-context signals, for instance, may be associated based on concurrence or near-concurrence. For example, if a device opens and edits a particular text file at or around a specific time each day, then the digital-context signal representing opening the text file may be annotated to indicate an association with the physical-context signal that represents the specific time. Such connections need not be limited to two contexts. For example, a user may arrive at a bowling alley with the same three friends on the same day of the week at the same time of day each week for several weeks. Further, the user may sit in the same seat at the same lane in the bowling alley, order a similar food order, and access the same website on a wearable device. In order to determine a user-context and find related content, the wearable device may receive several user-context signals representing aspects of this situation (e.g., location, time, companions, day of the week, etc.) and annotate each of the several user-context signals to indicate that they are associated with each other.

User-input may also define user-context signal associations. For example, user-input may instruct the wearable device to save all the current and recent user-context signals received by the wearable device and associate these user-context signals with each other. As another example, user-input may specifically define a connection between two or more contexts. For example, user-input may indicate that the digital context of using a work email account should be associated with the physical context being at work and that the digital-context signal representing using a home email account be associated with a physical-context signal representing any other location. To facilitate user-defined associations, a wearable device may provide a context-association GUI. Such a GUI may list some gathered user-context signals and receive user-input indicating associations. Then, the wearable device may annotate stored user-context signals based on user-defined associations. An exemplary GUI may group context signals by their source (e.g., a particular sensor for a physical-context signal or a device for a digital-context signal).

Some associations may be predefined by databases or other devices. For example, an email application may store contact information about a particular sender. If the user of the email application receives a phone call from the phone number listed in the particular sender's contact information, then a wearable device may annotate the user-context signals that represent the call and the emails from the particular sender to indicate that these context signals are related. As another example, a wearable device may reference a business website that lists the addresses of several regional offices. If a wearable device receives user-context signals that represent visits to two of the regional offices, the device may associate the user-context signals that represent these trips based on the information from the website.

In some cases, user-context signals may be associated through other user-context signals. For example, if a user accesses a particular fantasy football website while on the phone with one caller and later accesses the same website while on the phone with another caller, a wearable device may annotate the user-context signals representing each phone conversation with an indication that the calls are associated, based on their shared association with the user-context signal representing the fantasy football website.

A wearable device may also rank context-signal associations to better identify associations that are genuine and/or important to a user. For example, user-input and user-preferences may explicitly rank certain associations. Additionally, a wearable device may rank associations automatically. Some exemplary factors for automatically ranking associations may include: (a) nature of association (i.e., how a device determined that the signals were associated), (b) number of associating occurrences, (c) type of user-context signals, (d) rankings of user-context signals, (e) number of times association has been used, and/or (f) rankings of content identified from association. Other ranking criteria may also be used.

Procedures for associating of user-context signals may also involve removing associations between user-context signals. For instance, a context signal representing a user going to a certain class may be associated with a context signal representing a particular time of day. If the time of the class changes, a device may detect that the context signals representing the certain class no longer coincide with the particular time of day, and responsively remove the association between these context signals. As another example, a wearable device may dissociate user-context signals based on received user-input indicating that user-context signals representing interactions with a particular friend should be dissociated from other context signals. To facilitate user-defined dissociations, the wearable device may provide a dissociation functionality in the previously described context-association GUI.

e. Determining User-Context from Context Signals

Based on the gathered user-context signals, along with other input or user-preferences, a wearable device may determine a user-context associated with the wearable device itself and/or a user of the wearable device.

In some embodiments, a wearable device may determine a user-context by assigning a data-based description or characterization to the current user-context signals. For example, user-contexts may take the form of environment or state information such as "at home," "at work," "in a car," "with Charlie," "reading a book," "in a meeting," etc. Further, a user-context may be a qualitative description of the user's situation more than simply a description of the context signal data. For example, a wearable device may determine a user-context of "getting ready for work" based on received context signals indicating that it is 6:30 AM on a weekday and that a user is located at their home.

Additionally, a wearable device may define a user-context as a reading of all the current values of the gathered user-context signals, without performing any characterization of the user-context as a whole.

Further, the determined user-context may simply be a user-provided label for the current set of context signals received by the device. For example, a device may present a context-generation GUI, allowing a user to enter text describing the user-context (e.g., "office" or "Badger Prairie Park"). Then, the device may associate other user-context signals with the user-defined user-context. For example, a wearable device may detect that the user has tuned a radio application to a classical music station and opened a work email account on a desktop computer soon after user-input specified an "office" context. Therefore, context signals representing the user-interactions with the radio application and email account may be included in the "office" user-context. Other examples are also possible.

In some situations, the user-context may correspond only to the wearable device, and not to any user. For instance, a wearable device may determine, based on various context signals, that it is located in the living room or at the desk of a user. As such, the device may determine the context to be "living room" or "desktop," respectively.

Some exemplary methods may involve repeatedly determining a user-context. For example, a wearable device may determine a user-context at specified time intervals (e.g., once every two hours, every ten seconds, etc.) In this way, a wearable device may determine a user-context based on current context signals.

In some embodiments, a wearable device may repeat the process of determining a user-context only when the device detects that the received user-context signals have sufficiently changed. For example, once a wearable device has determined a user-context of "reading the newspaper", the device may determine that the user's location and behavior are not changing. In this scenario, the wearable device may refrain from determining a new user-context until the received user-context signals change sufficiently.

A sufficient change in user-context may involve detecting that a current user-context signal has changed. For example, if the user puts down the newspaper and turns on a laptop computer, then the user's behavior may have sufficiently changed. Additionally, a significant change in user-context may represent new user-context signals being received. For example, if the user's cellphone receives a call, the wearable device may determine a new user-context based on a received context signal indicating this call. A wearable device may also use, for instance, user-input, user-preferences, system settings, and/or numerous other factors as a basis for determining when the wearable device should determine a new user-context.

Grouping determined user-contexts into context groups may further help the wearable device to identify which user-context best fits the current set of user-context signals. For instance, a user-input may specify context groups representing a "work" context, a "driving to work" context, a "driving home from work" context, and a "home" context. Then, the device may associate user-contexts such as "on a business call", "in a board meeting", and "filling out reports" with the "work" context group, based on user-input or automated context-determination procedures.

Additionally, a wearable device may provide a GUI that lists these previously-stored context groups. Accordingly, if the user wants to load the "work" context, the user may readily identify the "work" context from the list of previously-stored context groups. Likewise, if the device receives several context signals that are associated with the "work" context group, the device may automatically activate the "work" context group and begin storing the current context as associated with the "work" context group.

f. Identifying Related Content

Once a wearable device has determined a user-context, the wearable device may then use this determined user-context as a basis for identifying computer-readable content that is related to the determined user-context. A wearable device may determine that content is related to the user-context based on various factors. Further, the wearable device may identify many different types of context-related content, from a variety of content sources.

In some cases, a wearable device may identify context-related content each time that the device determines a user-context. Alternatively or additionally, a wearable device may identify context-related content only when the determined user-context differs sufficiently from the previous user-context. For example, a wearable device may determine that a new user-context differs sufficiently from a previous user-context by storing data representing a first user-context and comparing these stored data to data representing a subsequently-determined second user-context. Then, if the data representing the second user-context differs sufficiently from the data representing the first user-context, the wearable device may identify content related to the second user-context.

A wearable device may determine that a second user-context differs sufficiently from a first user-context based on many factors. For example, user-preferences may indicate that changes in time, temperature, and ambient noise should not be considered as factors in determining whether a user-context is sufficiently different to necessitate identifying new context-related content. As another example, system settings, saved on a wearable device, may specify that the device always identify new content when the wearable device's user receives a telephone call.

Further, a wearable device may apply complex rules for determining what constitutes a sufficient change in user-context. For example, depending on whether a user is walking in an open field or in a shopping center, a wearable device may use different standards for determining whether a user-context differs sufficiently. In the situation of a user walking in an open field, for instance, the wearable device may be configured to identify new content each time that the user walks thirty yards. In contrast, the same wearable device may be configured to identify new content for every five yards that a user walks in a shopping center. Many other examples are possible.

A wearable device may identify context-related content based on previous user-context data. For example, a wearable device may detect that a user listens to a particular song when the user is at the gym. Therefore, a media-file of the particular song may be context-related content to a user-context of "entering the gym". In practice, a wearable device may identify this media-file based on context-signal associations. For example, the wearable device may annotate several physical-context signals (e.g., signals representing the user entering the gym) to indicate that these physical-context signals are associated with the digital-context signal representing the wearable device playing the media-file. Then, when the user enters the gym again, the wearable device may receive similar physical-context signals, and, based on the stored context-signal association, determine that the media-file is related the user-context. More generally, a wearable device may use any stored user-context data as a basis for identifying context-related content.

A wearable device may also identify context-related content based on new user-context data (i.e., without referring to stored user-context). For example, if the wearable device plays a particular song for the first time, then the wearable device may not have any stored user-context data that relates to this song. However, a music application on the wearable device may provide the wearable device with links (e.g., hyperlinks, access to download servers, data-files) to similar songs or to songs by the same artist. The wearable device may, therefore, determine that these provided links are context-related content without referring to any stored context-signal associations. As another example, a wearable device may receive, from a biometric sensor, a physical-context signal indicating that a user is thirsty. The wearable device may also receive, from a GPS system, a physical-context signal indicating that the user is at Union Station. To identify context-related content, the wearable device may then access a web browser, search in the web browser for a map of drinking fountains at Union Station, and use the results of this search as context-related content. A wearable device may also identify context-related content based on a combination of stored user-context data and new user-context data.

Context-related content may be any of a variety computer-readable media types. A comprehensive listing of file, folder, program, and application types that are readable by a typical computing device is not included here, as countless media types are well-known by persons of skill in the art. However, it should be noted that a wearable device may identify an entire digital object (e.g., a text document, a web browser, a spreadsheet file) or a specific portion of a digital object (e.g. a bookmark in a text document, a website, a particular table in a spreadsheet) as context-related content.

Further, wearable device may identify context-related content from various sources. For instance, a wearable device may identify new content from memory stored on the wearable device itself. Additionally, a wearable device may identify new content from a remote device, remote server, or accessible database. For example, a wearable device may use speech-recognition techniques to recognize spoken words from an audio signal. Then, the wearable device may search for context-related content by entering the recognized words as search terms in an Internet search. As another example, a work email server may archive messages from a user's business contacts. If a wearable device determines that the user has an upcoming meeting with a certain contact, then the wearable device may retrieve, from the email server, content sent to the user from this certain contact.

g. Adding New Content Objects

After identifying context-related content, the wearable device may add new selectable content objects, representing this context-related content, to a content region of an exemplary user-interface. For example, if a wearable device identifies a text file as context-related content, then the wearable device may add, to the content region of an exemplary user-interface, a content object that represents the text file.

As explained earlier, an exemplary content region, for example content region 604, may include a number of selectable content objects, for example content objects 606. Such content objects may represent computer-readable content. Further, the content objects may be selectable to allow access to the computer-readable content that they represent. For example, a wearable device may open a particular text file in response to receiving user-input selecting a content object that represents the text file.

In some cases, a user-interface may display content objects as indications of the content that they represent. For example, a content object representing a text document may show the title of the document, an excerpt from the text, and/or a brief abstract of the document. As another example, a content object representing an application may include the name of the application, the application's icon, and/or an image previewing the application's user-interface. As a further example, a content object representing a web page, in which a video features prominently, may show the page's title, an image of the page, and/or a low-resolution version of the video. Many other examples are possible.

In some cases, a content region may not have space to display content objects representing all of the identified context-related content. For example, if a wearable device detects that the user is interacting with a certain friend, the wearable device may access an email server and identify emails between the user and their friend. If the wearable device identifies hundreds of such emails, a content region may likely lack the space to display separate content objects for each email message.

To help alleviate this issue, a wearable device may assign rankings to the context-related content and use these rankings as a basis to select which content to represent with new content objects. For example, if a content region has three unoccupied spaces and a wearable device identifies ten pieces of context-related content, then the wearable device may rank these ten pieces of content. Then, the wearable device may add, to the unoccupied spaces in the content region, three content objects representing the three highest-ranked pieces of content. A wearable device may assign rankings, for instance, based on: (a) recency, (b) user-input, (c) number of associations with user-context, (d) type of content, (e) context history, (f) stored user-preferences, (g) resources used in displaying a content object representing the content, (h) resources needed to present the content, (i) similarity to content represented by current content objects, (j) rankings by remote systems, (k) rankings by other users, and/or (l) whether a current user-context differs sufficiently from a previous user-context. Further, if a remote system identifies and ranks new content, the wearable device may use the rankings from the remote system or assign new rankings to the content.

In addition to ranking content, a wearable device may group similar or related content into a combined content object. For instance, in the example of too many context-related emails, the wearable device may add individual content objects related to the highest-ranked messages (e.g., the most recent emails, the most read emails, etc.) and then add a single content object representing a list of all the other emails.

In some embodiments, a wearable device may also increase the available space for content objects. For example, the wearable device may enlarge the size of the content region and/or reduce the size of content objects so that more may fit in the content region. Additionally, a wearable device may add more content regions to increase the available space for new objects. Many other examples and implementations are possible.

h. Removing Existing Content Objects

In addition to adding content objects to a content region, a wearable device may remove content objects, in order to adjust the content region to correspond with the determined user-context. A wearable device may remove content objects based on several factors.

For example, a wearable device may remove a content object that represents "old" content (i.e., content that relates to an out-of-date user-context). In this case, a wearable device may determine that the old content does not relate to the current user-context and, in response, remove content objects representing the old content. As a specific example, if a content object represents a map of a certain building, the wearable device may remove this content object upon determining that the wearable device has left the building.

Additionally, a wearable device may remove content objects to make room for new objects, regardless of whether the content objects represent context-related content. For example, the wearable device may have recently entered a building and added a content object representing a map of the building to the content region. Then, the wearable device may identify a large set of other context-related content. In this scenario, even though the map may not have decreased in relevance, the wearable device may remove the content object representing the map, in order to make room for new content objects.

A wearable device may also select content objects for removal based on user-input, user-preferences, or previous context data. For example, user-preferences stored on a wearable device may specify that the wearable device should remove content objects representing building maps when the wearable device determines that it has been in a building for longer than a predefined period of time.

A wearable device may remove content objects based on many other factors, as well. For example, a wearable device may remove content objects based on: (a) recency, (b) number of associations with other objects, (c) user-ratings of content, (d) type of context signal, (e) context history, (f) similar content objects currently in the content region, (g) resources used in displaying the content object, (h) resources needed to display the full content, (i) rankings of associations with content, (j) rankings by other users, and/or (k) whether a current user-context differs sufficiently from a previous user-context. Numerous other factors may, additionally, be used in selecting objects for removal. A wearable device may remove content objects in any of a variety of ways. For example, FIGS. 7B and 7C illustrate aspects of exemplary techniques for removing content objects from a user-interface 700. Additionally, the wearable device may replace current content objects with new content objects in a variety of ways. FIGS. 7D and 7E illustrate aspects of exemplary techniques for replacing existing content objects with new content objects.

Figure 7A:
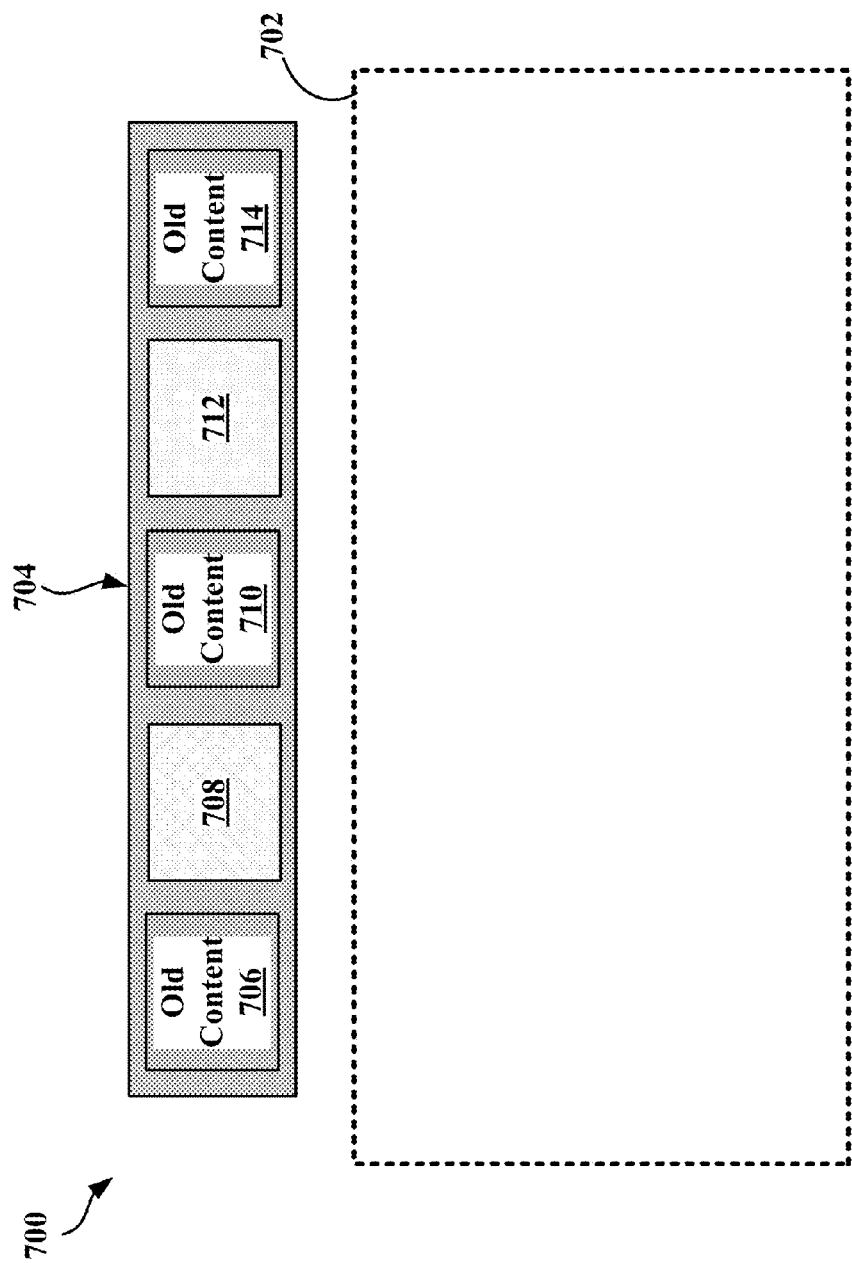
FIG. 7A shows aspects of an example user-interface that includes context-based content objects.
Figure 7C:
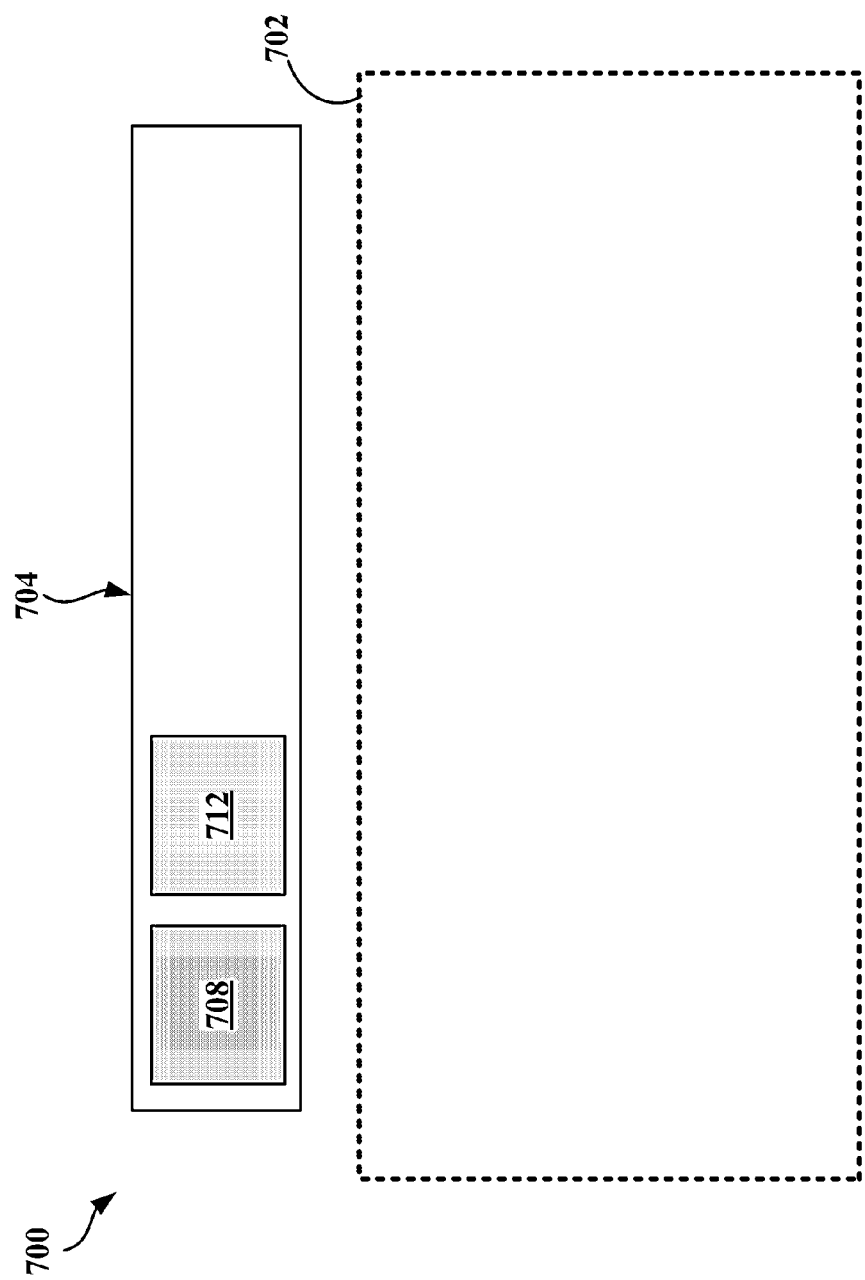
FIG. 7C shows aspects of an example user-interface after removing content objects.
Figure 7D:
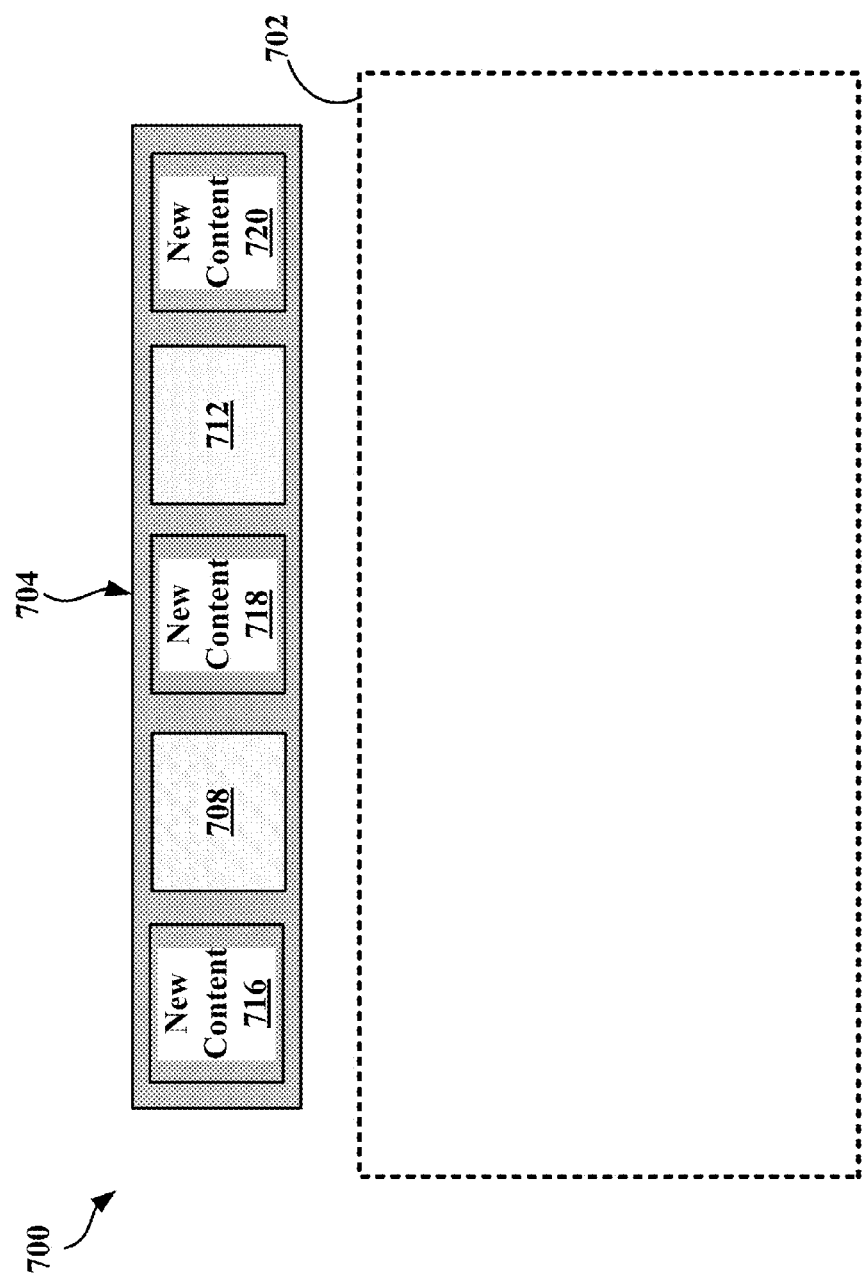
FIG. 7D shows aspects of an example user-interface after adding content objects.
Figure 7E:
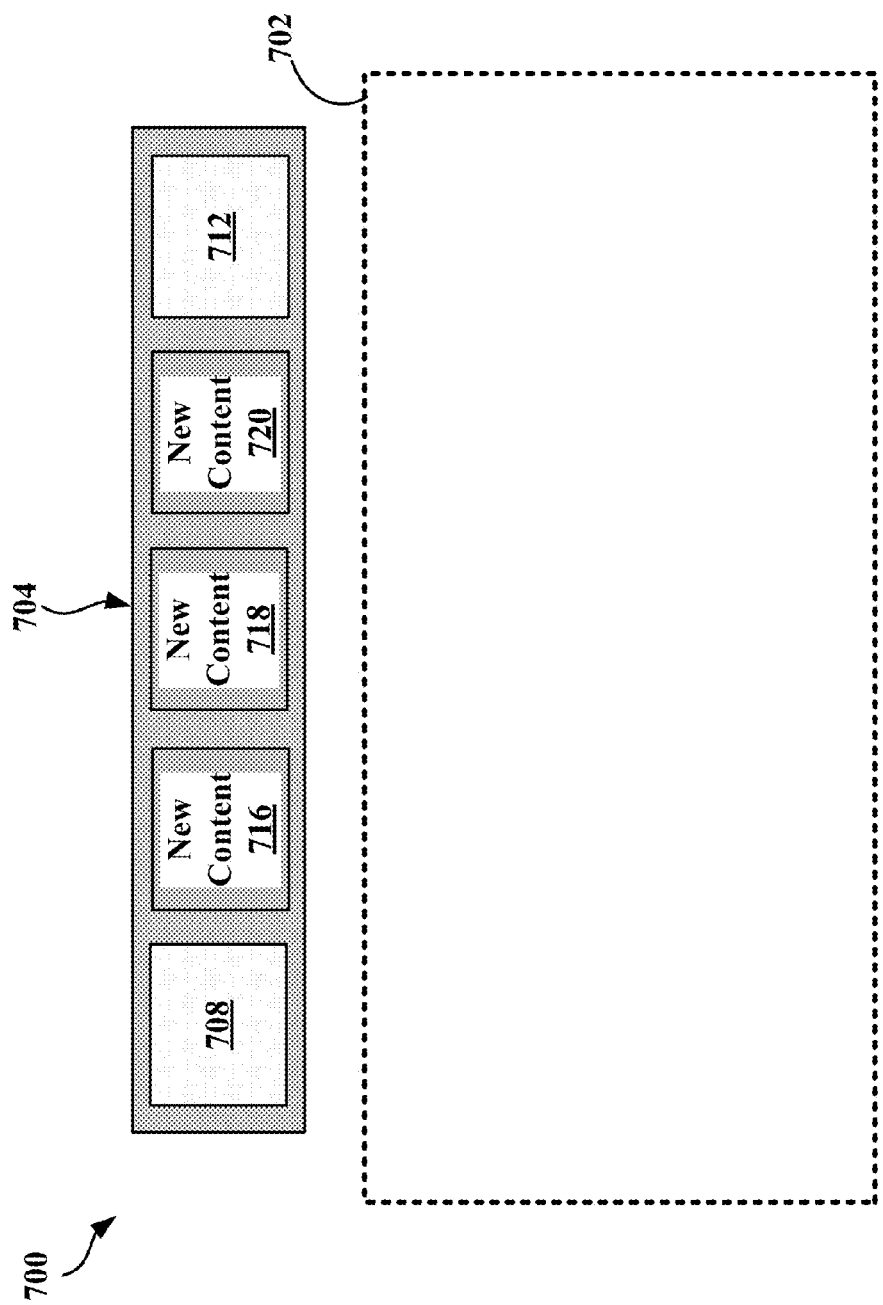
FIG. 7E shows aspects of an example user-interface after adding content objects.

FIG. 7A shows exemplary user-interface 700, including view region 702 and content region 704, before the removal and/or replacement techniques of FIGS. 7B-7E are performed. Content region 704 contains three content objects (706, 710, and 714) that represent old content, and two other content objects (708 and 712) that represent other content. As explained above, a wearable device may remove content objects whether or not the content objects represent old, or outdated, content.

FIG. 7B shows exemplary user-interface 700 from FIG. 7A after the wearable device has removed content objects 706, 710, and 714. In this example, the wearable device has not repositioned remaining content objects 708 and 712 after removing content objects 706, 710, and 714.

FIG. 7C also shows user-interface 700 from FIG. 7A after the wearable device has removed content objects 706, 710, and 714. In this example, the wearable device has repositioned content objects 708 and 712 toward the left portion of the content region after removing content objects 706, 710, and 714. Though FIG. 7C shows an example in which the wearable device has moved remaining content objects 708 and 712 toward the left, a wearable device may move remaining content objects toward the center, toward the right, away from center, or to any other portion of the content region depending on user-preferences and/or system settings. An exemplary wearable device may also combine the examples of FIGS. 7B and 7C and/or use other techniques for removing content objects.

As an example of replacing existing content objects with new content objects, FIG. 7D shows exemplary user-interface 700 from FIG. 7A after the wearable device has replaced content objects 706, 710, and 714 with new content objects 716, 718 and 720. In this example, as in the example shown in FIG. 7B, the wearable device has not repositioned remaining content objects 708 and 712, so that new content objects 716, 718 and 720 occupy the original positions of removed objects 706, 710, and 714.

FIG. 7E shows another technique for replacing existing content objects with new content objects. In this example, the wearable device has replaced content objects 706, 710, and 714 with new content objects 716, 718 and 720 to user-interface 700. Additionally, the wearable device has repositioned remaining content objects 708 and 712 to positions away from the center of content region 706 and placed new content objects 716, 718, and 720 near the center of content region 706. This technique may, for instance, help a user to distinguish which content objects represent content that a wearable device has recently added to the content region. As with the removal example shown in FIG. 7C, it should be understood that a wearable device may position new and remaining content objects in any portion of the content region depending on user-preferences or system settings. An exemplary wearable device may also combine the examples of FIGS. 7C and 7D and/or use other techniques for removing content objects. Numerous other examples are possible.

i. Detecting a Given Movement and Displaying the Context-Related Content Region

After the wearable device determines a user-context and dynamically changes the content objects in a content region, for example content objects 606 in content region 604, the wearable device may display the content region 604 in the view region 602. If the content region 604 is not initially displayed in the view region 602, then the wearable device may be configured to display the content region 604 in response to a given movement of the wearable device. For example, as illustrated by block 508 in FIG. 5, a wearable device may receive movement data corresponding to a given movement of the wearable device. Then, as shown in block 510, the wearable device may respond to receiving this movement data by causing one or both of the view region 602 and the content region 604 to move such that the content region 604 becomes more visible in the view region 602.

For example, the given movement may comprise an upward movement of wearable device to a position above the device's original position. In response to this upward movement, the wearable device may cause the view region 602 to move upward, for instance. Additionally, the wearable device may respond to this upward movement by causing the content region 604 to move downward. The view region 602 and the content region 604 may move the same amount, or may move different amounts. In one embodiment, the content region 604 may move further than the view region 602. As another example, the wearable device may cause only the content region 604 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable device. Other reference frames are possible as well. In embodiments where the wearable device is a head-mounted device, the upward movement of the wearable device may also be an upward movement of a wearer's head such as, for example, the user looking upward.

The movement data corresponding to the given movement may take several forms. For example, the movement data may be (or may be derived from) data received from one or more movement sensors, accelerometers, and/or gyroscopes configured to detect the movement, such as the sensor 122 described above in connection with FIG. 1A. In some embodiments, the movement data may comprise a binary indication corresponding to the given movement. In other embodiments, the movement data may comprise an indication corresponding to the given movement as well as an extent of the movement. The movement data may take other forms as well.

Figure 8A:
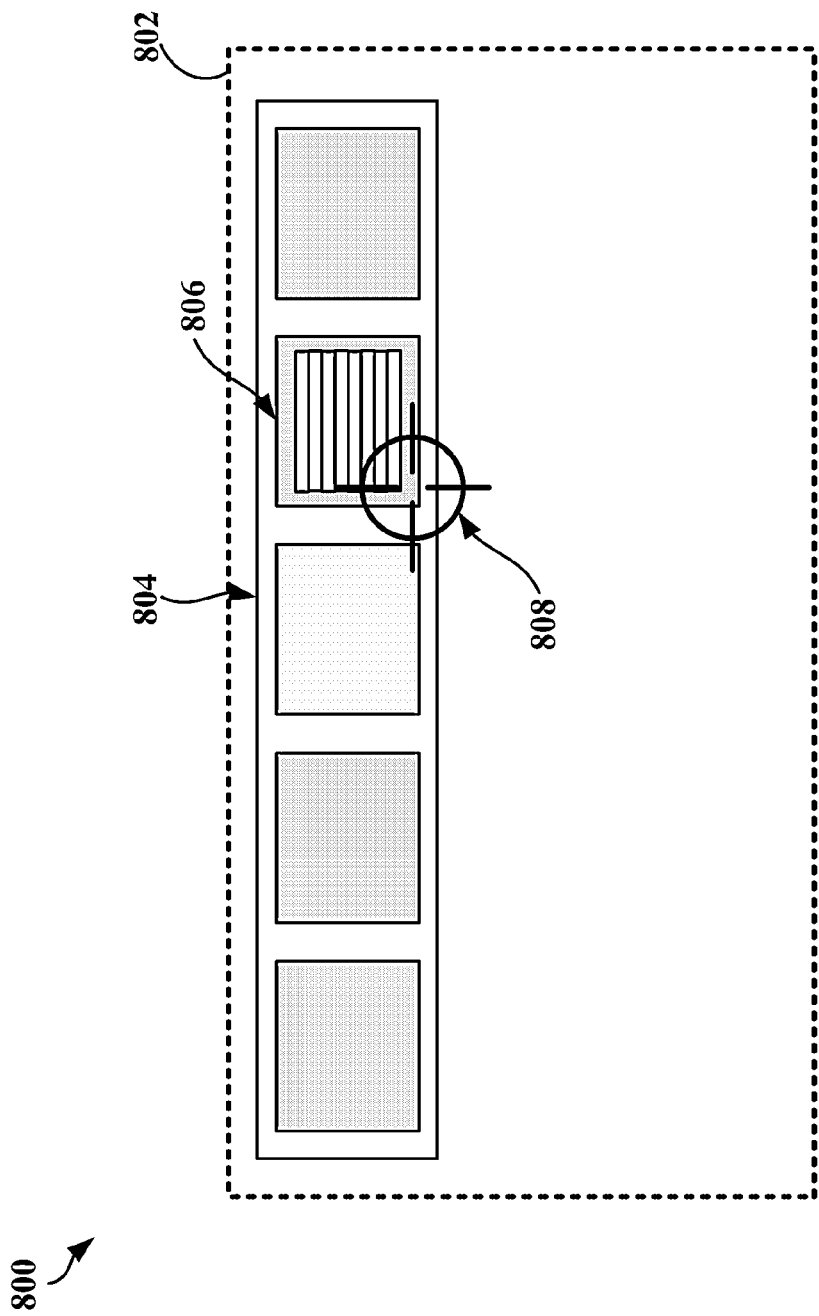
FIG. 8A shows aspects of an example user-interface after receiving movement data corresponding to the specified movement.
Figure 8B:
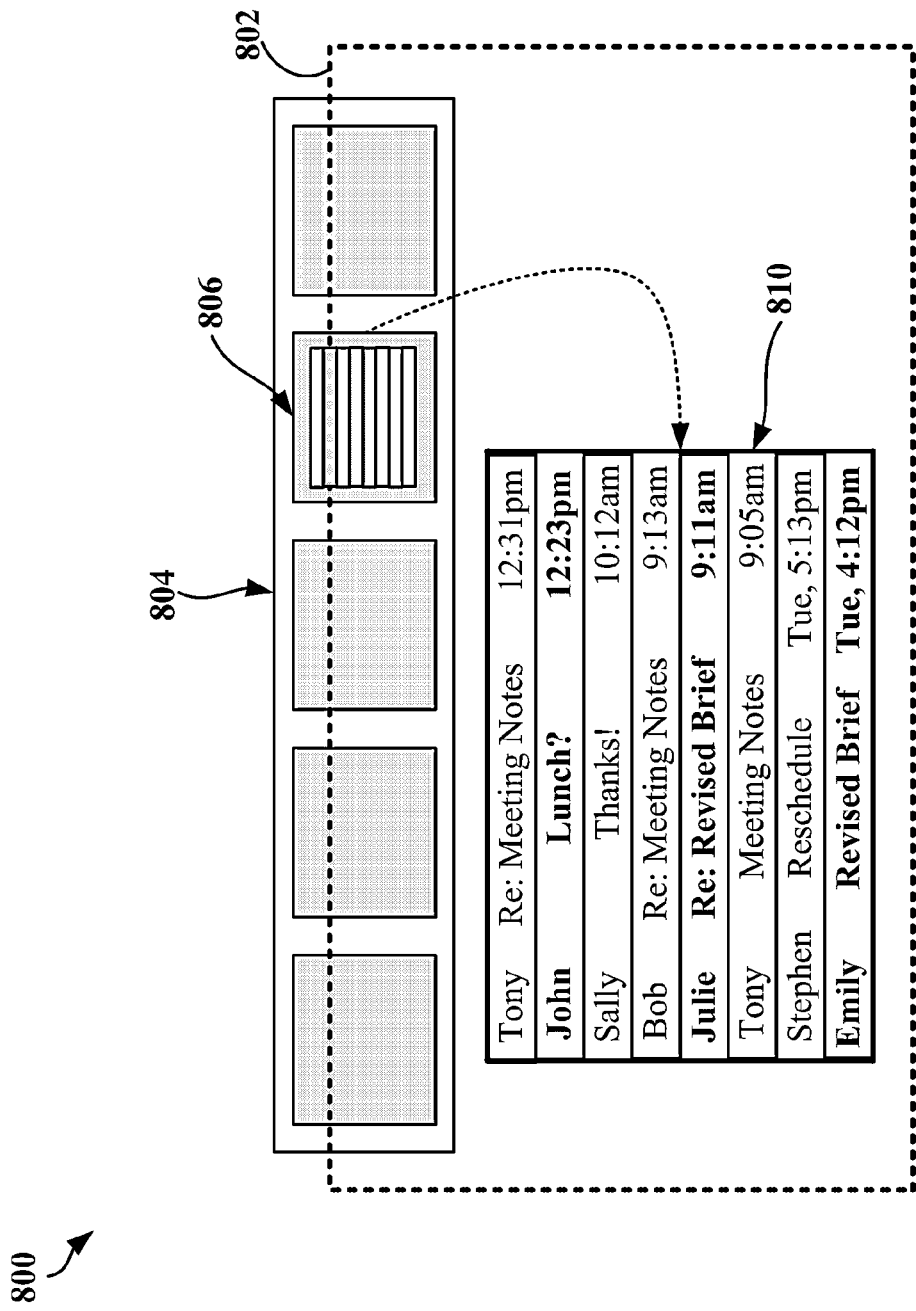
FIG. 8B shows aspects of an example user-interface after selection of a selected content object.

FIG. 8A shows aspects of an example user-interface after receiving movement data corresponding to a given movement. As shown, the user-interface 800 includes the view region 802 and the content region 804.

As noted above, in response to receiving the movement data corresponding to a given movement of the wearable device, the wearable device may move one or both of the view region 802 and the content region 804 such that the content region 804 becomes more visible in the view region 802.

As shown, the content region 804 is fully visible in the view region 802. In other embodiments, however, only a portion of the content region 804 may be visible in the view region 802. In some embodiments, the extent to which the content region 804 is visible in the view region 802 may be based at least in part on an extent of the given movement.

Thus, the view region 802 may be moved in response to receiving data corresponding to a given movement. In some embodiments, the view region 802 may be moved in a scrolling or panning motion. For instance, the view region 802 may appear to a wearer of the wearable device as if mapped onto the inside of a static sphere centered at the wearable device, and movement of the view region 802 may map onto movement of the real-world environment relative to the wearable device. A speed, acceleration, and/or magnitude of the scrolling may be based at least in part on a speed, acceleration, and/or magnitude of the movement. In other embodiments, the view region 802 may be moved by, for example, jumping between fields of view. In still other embodiments, the view region 802 may be moved only when the given movement exceeds a threshold speed, acceleration, and/or magnitude. In response to receiving data corresponding to an given movement that exceeds such a threshold or thresholds, the view region 802 may pan, scroll, slide, or jump to a new field of view. The view region 802 may be moved in other manners as well.

A wearable device may more fully display the content region 804 in the view region 802 before or after the wearable device changes the content region 804 to correspond with a determined user-context. In some cases, the wearable device may continue to change the content region 804, while the content region 804 is displayed. In other embodiments, the set of content objects in the content region 804 may remain the same while the wearable device displays the content region 804. In such an implementation, the wearable device may only add or remove content objects while the content region is not displayed in the view region.

In some embodiments, the wearable device may be further configured to receive from the wearer a selection of a content object 806 from the content region 804. To this end, the user-interface 800 may include a cursor 808, shown in FIG. 8A as a reticle, which may be used to navigate to and select content objects 806 from the content region 804. In some embodiments, the cursor 808 may be controlled by a wearer of the wearable device through one or more predetermined movements. Accordingly, the wearable device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable device, like the sensor 122, or may be included in a peripheral device communicatively coupled to the wearable device. As another example, the selection data may be (or may be derived from) data received from a touch pad, such as the finger-operable touch pad 124 described above in connection with FIG. 1A, or other input device included in or coupled to the wearable device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable device or peripheral device. In some embodiments, the predetermined movements may include one or more predetermined movements defined as no or substantially no movement, such as no or substantially no movement for a predetermined period of time. In embodiments where the wearable device is a head-mounted device, one or more predetermined movements may involve a predetermined movement of the wearer's head (which is assumed to move the wearable device in a corresponding manner). Alternatively or additionally, the predetermined movements may involve a predetermined movement of a peripheral device communicatively coupled to the wearable device. The peripheral device may similarly be wearable by a wearer of the wearable device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable device has navigated the cursor 808 to the content object 806 using one or more predetermined movements. In order to select the content object 806, the wearer may perform an additional predetermined movement, such as holding the cursor 808 over the content object 806 for a predetermined period of time. The wearer may select the content object 806 in other manners as well.

Figure 8C:
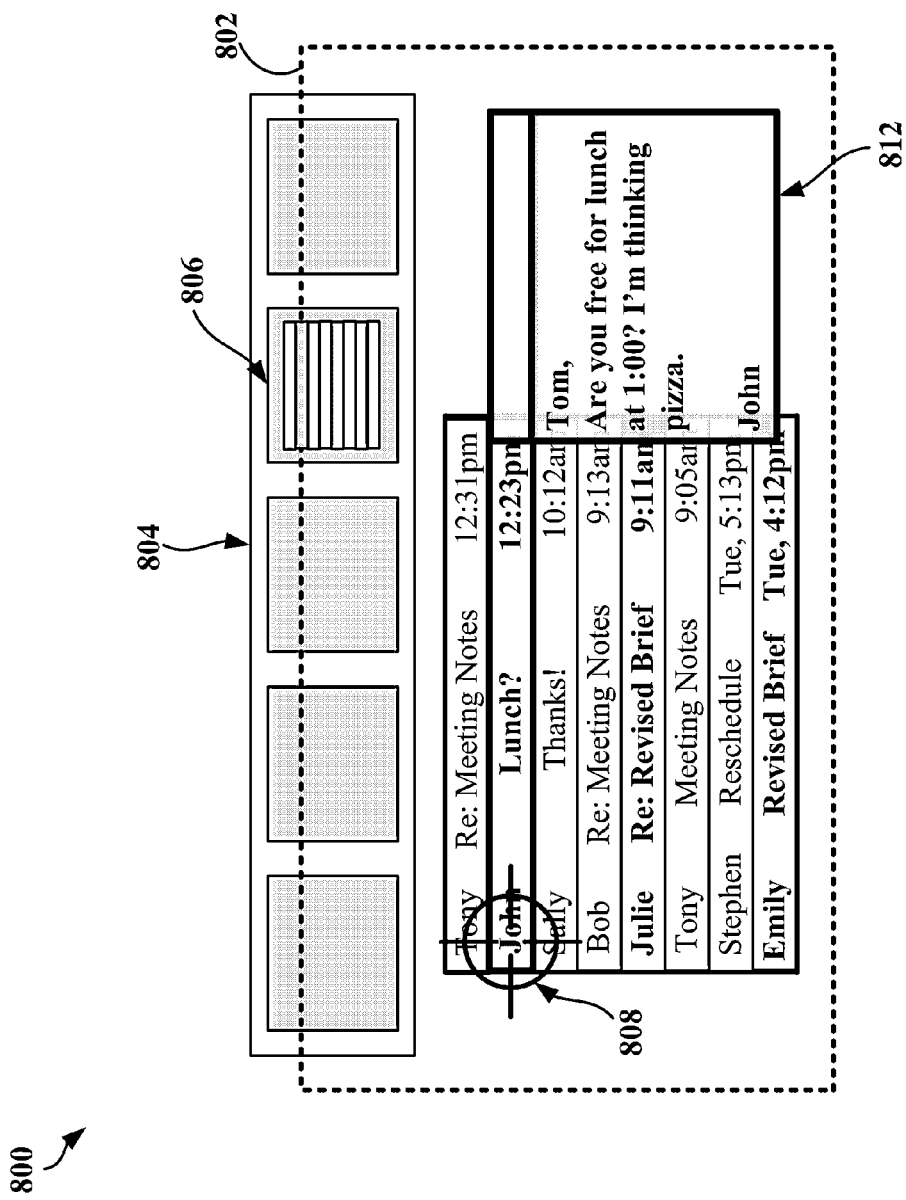
FIG. 8C shows aspects of an example user-interface after receiving input data corresponding to a user-input.

Once a content object 806 is selected, the wearable device may cause the content object 806 to be displayed in the view region 802 as a selected content object. FIG. 8C shows aspects of an example user-interface after selection of a selected content object, in accordance with an embodiment.

As indicated by the dotted arrow, the content object 806 is displayed in the view region 802 as a selected content object 810. As shown, the selected content object 810 is displayed larger and in more detail in the view region 802 than in the content region 804. In other embodiments, however, the selected content object 810 could be displayed in the view region 802 smaller than or the same size as, and in less detail than or the same detail as, the content region 804. In some embodiments, additional content (e.g., actions to be applied to, with, or based on the selected content object 810, information related to the selected content object 810, and/or modifiable options, preferences, or parameters for the selected content object 810, etc.) may be shown adjacent to or nearby the selected content object 810 in the view region 802.

Once the selected content object 810 is displayed in the view region 802, a wearer of the wearable device may interact with the selected content object 810. For example, as the selected content object 810 is shown as an email inbox, the wearer may wish to read one of the emails in the email inbox. Depending on the selected content object, the wearer may interact with the selected content object in other ways as well (e.g., the wearer may locate additional information related to the selected content object 810, modify, augment, and/or delete the selected content object 810, etc.). To this end, the wearable device may be further configured to receive input data corresponding to one or more predetermined movements indicating interactions with the user-interface 800. The input data may take any of the forms described above in connection with the selection data.

FIG. 8C shows aspects of an example user-interface after receiving input data corresponding to a user input, in accordance with an embodiment. As shown, a wearer of the wearable device has navigated the cursor 808 to a particular subject line in the email inbox and selected the subject line. As a result, the email 812 is displayed in the view region, so that the wearer may read the email 812. The wearer may interact with the user-interface 800 in other manners as well, depending on, for example, the selected content object.

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method implemented by a head-mountable device comprising:
    receiving, by the head-mountable computing device, input data that is indicative of head position;
    providing, by the head-mountable computing device, a user-interface that comprises a content region containing a set of selectable content objects that are horizontally arranged, wherein the content region is located at a fixed height within the user-interface;
    defining, by the head-mountable computing device, a view region that is movable within the user-interface, wherein the view region is smaller than the user-interface;
    associating, by the head-mountable computing device, a forward-looking head position with a first location of the view region within the user-interface, wherein the fixed height of the content region is such that at least a portion of the content region is located above the view region, when the view region is at the first location associated with forward-looking head position;
    based on head movement data, moving the view region within the user-interface, wherein the head movement data is determined based on the input data that is indicative of head position;
    as the view region moves within the user-interface, displaying a portion of the user-interface corresponding to the view region in the see-through display;
    determining a first user-context associated with the head-mountable device; and
    dynamically changing the set of selectable content objects contained in the content region based on the determined first user-context.

2. The method of claim 1, wherein the user-interface is configured such that the content region is substantially arranged along an at least partial ring above the view region.

3. The method of claim 1, wherein the content region is initially not displayed at all in the first portion of the user-interface.

4. The method of claim 1, wherein determining the first user-context associated with the head-mountable device comprises:
    transmitting one or more user-context signals to a remote server system, wherein the one or more user-context signals are associated with the head-mountable device; and
    receiving from the remote server system an indication of a first user-context associated with the head-mountable device.

5. The method of claim 1, wherein the first user-context is determined based on both physical context signals and digital context signals.

6. The method of claim 1, wherein the user-context is determined based on one or more user-context signals, wherein the one or more user-context signals comprise one or more of the following: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with a user-profile, such as information regarding events or statuses of a user or a user's friends, (t) information accessible via a user's social networking account, such as information relating a user's status, statuses of a user's friends in a social network group, and/or communications between the user and the user's friends, (u) ambient noise level (v) any recognizable sounds detected around the head-mountable device, (w) items that are currently detected around the head-mountable device, (x) items that have been detected around the head-mountable device, (y) items with which other devices associated with a user of the head-mountable device are currently in communication, (z) items with which other devices associated with a user of the head-mountable device have been in communication (aa) information derived from cross-referencing any two or more of: information on a user's calendar, information available via a user's social networking account, and other context signals and sources of context information, (bb) health statistics and characterizations of a user's current health, (cc) a user's recent context as determined from sensors on or near the user and/or other sources of context information, (dd) a current location, (ee) a past location, (ff) a future location, (gg) computer-readable media currently accessed on the wearable computing device, (hh) computer-readable media previously accessed on the head-mountable device, (ii) computer-readable media currently accessed on other devices associated with a user of the head-mountable device, and (jj) computer-readable media previously accessed on other devices associated with a user of the head-mountable device.

7. The method of claim 1, wherein dynamically changing the set of selectable content objects contained in the content region comprises (i) identifying content related to the determined user-context and (ii) adding, to the set of selectable content objects contained in the content region, a selectable content object that references the identified content.

8. The method of claim 1, wherein dynamically changing the set of selectable content objects contained in the content region comprises (i) identifying at least one selectable content object that is contained in the content region and is no longer associated with a current user-context; and (ii) removing, from the set of selectable content objects contained in the content region, the identified at least one selectable content object.

9. The method of claim 1, wherein determining the first user-context associated with the head-mountable device is performed repeatedly, and wherein dynamically changing the set of selectable content objects contained in the content region is also performed repeatedly.

10. The method of claim 9, further comprising:
storing data representing the first user-context;
determining a second user-context associated with the head-mountable device;
using the stored data representing the first user-context to determine that the second user-context differs sufficiently from the first user-context; and
in response to determining that the second user-context differs sufficiently from the first user-context, dynamically changing the set of selectable content objects contained in the content region based on the determined second user-context.

11. The method of claim 1, further comprising:
receiving input selecting one or more content objects from the set of selectable content objects contained in the content region; and
displaying in the view region content associated with the selected one or more content objects.

12. A head-mountable device (HMD) comprising:
a see-through display;
at least one processor; and
data storage comprising logic executable by the at least one processor to:
receive input data that is indicative of head position;
define a user-interface that comprises a content region containing a set of selectable content objects that are horizontally arranged, wherein the content region is located at a fixed height within the user-interface;
define a view region that is movable within the user-interface, wherein the view region is smaller than the user-interface;
associate a forward-looking head position with a first location of the view region within the user-interface, wherein the fixed height of the content region is such that at least a portion of the content region is located above the view region, when the view region is at the first location associated with forward-looking head position;
based on head movement data, move the view region within the user-interface, wherein the head movement data is determined based on the input data that is indicative of head position;
as the view region moves within the user-interface, display a portion of the user-interface corresponding to the view region in the see-through display;
determine a first user-context associated with the head-mountable device; and
dynamically change the set of selectable content objects contained in the content region based on the determined first user-context.

13. The head-mountable device of claim 12, wherein determining the first user-context associated with the wearable computing device comprises:
transmitting one or more user-context signals to a remote server system, wherein the one or more user-context signals are associated with the head-mountable device; and
receiving from the remote server system an indication of a first user-context associated with the head-mountable device.

14. The head-mountable device of claim 12, wherein the logic is further executable by the at least one processor to:
receive input selecting one or more content objects from the set of selectable content objects contained in the content region; and
display in the view region content associated with the selected one or more content objects.

15. The wearable computing device of claim 12, further comprising:
one or more communicative links to other digital devices, wherein the other digital devices are associated with a user of the head-mountable device; and
wherein the user-context is determined based on one or more user-context signals received from the other digital devices through the one or more communicative links.

16. The HMD of claim 12, wherein a first subset from the set of selectable content objects is located at a fixed horizontal position within the user-interface, and wherein a second subset from the set of selectable content objects is horizontally moveable with respect to the user-interface based on input data indicative of horizontal head movement.

17. The HMD of claim 16, wherein the second subset comprises one or more tools.

18. A non-transitory computer-readable medium having stored thereon instructions executable by a computing device to cause the computing device to perform functions comprising:
receiving, by the head-mountable computing device, input data that is indicative of head position;
providing, by the head-mountable computing device, a user-interface that comprises a content region containing a set of selectable content objects that are horizontally arranged, wherein the content region is located at a fixed height within the user-interface;
defining, by the head-mountable computing device, a view region that is movable within the user-interface, wherein the view region is smaller than the user-interface;
associating, by the head-mountable computing device, a forward-looking head position with a first location of the view region within the user-interface, wherein the fixed height of the content region is such that at least a portion of the content region is located above the view region, when the view region is at the first location associated with forward-looking head position;
based on head movement data, moving the view region within the user-interface, wherein the head movement data is determined based on the input data that is indicative of head position;
as the view region moves within the user-interface, displaying a portion of the user-interface corresponding to the view region in the see-through display;
determining a first user-context associated with the head-mountable device; and
dynamically changing the set of selectable content objects contained in the content region based on the determined first user-context.

19. The non-transitory computer-readable medium of claim 18, wherein determining the user-context associated with the wearable computing device comprises:
transmitting one or more user-context signals to a remote server system, wherein the one or more user-context signals are associated with the head-mountable device; and
receiving from the remote server system an indication of a user-context associated with the head-mountable device.

* * * * *